US011324006B2

(12) United States Patent
Yang et al.

(10) Patent No.: US 11,324,006 B2
(45) Date of Patent: May 3, 2022

(54) SIGNALING FOR SUB-SLOT TIME-DOMAIN RESOURCE ALLOCATION

(71) Applicant: QUALCOMM Incorporated, San Diego, CA (US)

(72) Inventors: Wei Yang, San Diego, CA (US); Jing Jiang, San Diego, CA (US); Yi Huang, San Diego, CA (US); Renqiu Wang, San Diego, CA (US); Wanshi Chen, San Diego, CA (US); Peter Gaal, San Diego, CA (US); Chih-Ping Li, San Diego, CA (US); Tingfang Ji, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/407,937

(22) Filed: May 9, 2019

(65) Prior Publication Data
US 2019/0349941 A1  Nov. 14, 2019

Related U.S. Application Data

(60) Provisional application No. 62/720,897, filed on Aug. 21, 2018, provisional application No. 62/670,540, filed on May 11, 2018.

(51) Int. Cl.
*H04W 72/04* (2009.01)
*H04W 72/14* (2009.01)
(Continued)

(52) U.S. Cl.
CPC ....... *H04W 72/0493* (2013.01); *H04L 1/1819* (2013.01); *H04L 5/0055* (2013.01);
(Continued)

(58) Field of Classification Search
CPC ....... H04L 1/00; H04L 1/1819; H04L 1/1893; H04L 1/1896; H04L 5/0007;
(Continued)

(56) References Cited

U.S. PATENT DOCUMENTS

2013/0301490 A1\* 11/2013 He ................... H04W 52/0209
370/280
2018/0063858 A1   3/2018 Au et al.
(Continued)

FOREIGN PATENT DOCUMENTS

WO   2017172452 A1   10/2017
WO   2018028435 A1   2/2018

OTHER PUBLICATIONS

Ericsson, et al.,"Text proposal on 1ms HARQ bits inclusion in a slot/subslot transmission", 3GPP Draft, 3GPP TSG-RAN WG1 Meeting #92, R1-1803248—1MS HARQ Bits Inclusio, 3rd Generation Partnership Project (3GPP), Mobile Competence Center, 650, Route Des Lucioles, F-06921, Sophia-Antipolis Cedex, France, vol. RAN WG1, No. Athens, Greece, Feb. 26, 2018-Mar. 2, 2018, Feb. 22, 2018 (Feb. 22, 2018), XP051398361, 12 pages, Retrieved from the nternet: URL: http://www.3gpp.org/ftp/tsg%5Fran/WG1% 5FRL1/TSGR1%5F92/Docs/. [retrieved on Feb. 22, 2018].
(Continued)

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a user equipment (UE) may determine that signaling associated with a resource allocation is associated with a service type. The UE may identify a time-domain resource, for a transmission associated with the service type, in connection with determining that the signaling associated with the allocation is
(Continued)

associated with the service type. Numerous othNo errors found.er aspects are provided.

50 Claims, 15 Drawing Sheets

(51) Int. Cl.
*H04L 5/00* (2006.01)
*H04W 76/27* (2018.01)
*H04W 72/12* (2009.01)
*H04L 1/18* (2006.01)
*H04W 24/08* (2009.01)

(52) U.S. Cl.
CPC ......... *H04W 24/08* (2013.01); *H04W 72/042* (2013.01); *H04W 72/0446* (2013.01); *H04W 72/1257* (2013.01); *H04W 72/14* (2013.01); *H04W 76/27* (2018.02)

(58) Field of Classification Search
CPC ... H04L 5/0044; H04L 5/0055; H04L 5/0082; H04L 5/0094; H04W 24/08; H04W 72/04; H04W 72/042; H04W 72/0446; H04W 72/0493; H04W 72/1257; H04W 72/14; H04W 76/27
See application file for complete search history.

(56) References Cited

U.S. PATENT DOCUMENTS

| | | | |
|---|---|---|---|
| 2018/0077719 A1 | 3/2018 | Nory et al. | |
| 2018/0324861 A1* | 11/2018 | Oh | H04L 27/0006 |
| 2019/0281622 A1* | 9/2019 | Hwang | H04W 52/58 |
| 2019/0335449 A1 | 10/2019 | Xiong et al. | |
| 2019/0349795 A1* | 11/2019 | Park | H04W 24/08 |
| 2019/0364563 A1* | 11/2019 | Jung | H04W 72/042 |
| 2020/0015119 A1* | 1/2020 | Takeda | H04L 1/1812 |
| 2020/0067574 A1 | 2/2020 | Yang et al. | |
| 2020/0196335 A1 | 6/2020 | Lei et al. | |
| 2020/0351838 A1 | 11/2020 | Kim et al. | |

OTHER PUBLICATIONS

LG Electronics: "Discussion on pre-emption indication for downlink", 3GPP Draft; R1-1710336 Discussion on Preemption Indication for DL, 3rd Generation Partnership Project (3GPP), Mobile Competence Centre ; 650, Route Des Lucioles ; F-06921 Sophia-Antipolis Cedex; Fran, vol. RAN WG1, No. Qingdao, P.R. China; Jun. 27, 2017-Jun. 30, 2017, Jun. 26, 2017 (Jun. 26, 2017), XP051299551,4 Pages, Retrieved from the Internet: URL:http://www.3gpp.org/ftp/Meetings_3GPP_SYNC/RAN1/Docs/ [retrieved on Jun. 26, 2017], Sections 2-4, Options 1-3.
Partial International Search Report—PCT/US2019/031812—ISA/EPO—dated Jul. 1, 2019.
HUAWEI., et al., "Control Signaling Enhancements for Short TTI", 3GPP Draft, 3GPP TSG-RAN WG1#83, R1-156461, 3rd Generation Partnership Project (3GPP), Mobile Competence Centre, 350, Route Des Lucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), XP051002921, Retrieved from the Internet: URL: http://www.3gpp.org/ftp/tsg_ran/WG1_RL1/TSGR1_83/Docs/R1-156461.zip.
Huawei et al., "PUCCH Resource Allocation for Non-Slot Scheduling", 3GPP Draft; R1-1804293, 3rd Generation Partnership Project (3GPP), Mobile Competence Centre ; 650, Route Des Lucioles; F-06921 Sophia-Antipolis Cedex France, vol. RAN WG1, No. Sanya, China; Apr. 16, 2018-Apr. 20, 2018, Apr. 15, 2018 (Apr. 15, 2018), XP051426581, 3 Pages, Retrieved from the Internet: URL:http://www.3gpp.org/ftp/Meetings%5F3GPP%5FSYNC/RAN1/Docs/ [retrieved on Apr. 15, 2018], Section 2.
Huawei et al., "Summary of 7.2.2 Study of Necessity of a New DCI Format", 3GPP Draft; R1-1803413, 3rd Generation Partnership Project (3GPP), Mobile Competence Centre ; 650, Route Des Lucioles ; F-06921 Sophia-Antipolis Cedex; France, vol. RAN WG1, No. Athens, Greece; Feb. 26, 2018-Mar. 2, 2018, Mar. 1, 2018 (Mar. 1, 2018), XP051398635, 21 Pages, Retrieved from the Internet: URL:http://www.3gpp.org/ftp/tsg%5Fran/WG1%5FRL1/fSGR1%5F92/Docs/ [retrieved on Mar. 1, 2018], tables 3.2-1, 3.2-2.
International Search Report and Written Opinion—PCT/US2019/031812—ISA/EPO—dated Dec. 18, 2019.

* cited by examiner

SIGNALING FOR SUB-SLOT TIME-DOMAIN RESOURCE ALLOCATION

CROSS-REFERENCE TO RELATED APPLICATIONS UNDER 35 U.S.C. § 119

This application claims priority to Provisional Patent Application No. 62/670,540, filed on May 11, 2018, entitled "TECHNIQUES AND APPARATUSES FOR PERFORMING SIGNALING FOR TIME-DOMAIN RESOURCE ALLOCATION OF ULTRA-RELIABLE LOW LATENCY COMMUNICATION (URLLC)," and to Provisional Patent Application No. 62/720,897, filed on Aug. 21, 2018, entitled "TECHNIQUES FOR MULTIPLE FEEDBACK TRANSMISSIONS PER SLOT IN WIRELESS COMMUNICATIONS," which are hereby expressly incorporated by reference herein.

FIELD OF THE DISCLOSURE

Aspects of the present disclosure generally relate to wireless communication, and to techniques and apparatuses for signaling for sub-slot time-domain resource allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that signaling associated with a resource allocation is associated with a service type; and identifying a time-domain resource, for a transmission associated with the service type, in connection with determining that the signaling associated with the resource allocation is associated with the service type, wherein the time-domain resource is identified based at least in part on at least one of a reference point associated with the resource allocation or a unit of granularity associated with the resource allocation.

In some aspects, a user equipment for wireless communication may include memory and one or more processors coupled to the memory. The memory and the one or more processors may be configured to determine that signaling associated with a resource allocation is associated with a service type; and identify a time-domain resource, for a transmission associated with the service type, in connection with determining that the signaling associated with the resource allocation is associated with the service type, wherein the time-domain resource is identified based at least in part on at least one of a reference point associated with the resource allocation or a unit of granularity associated with the resource allocation.

In some aspects, a non-transitory computer-readable medium may store one or more instructions for wireless communication. The one or more instructions, when executed by one or more processors of a user equipment, may cause the one or more processors to determine that signaling associated with a resource allocation is associated with a service type; and identify a time-domain resource, for a transmission associated with the service type, in connection with determining that the signaling associated with the resource allocation is associated with the service type, wherein the time-domain resource is identified based at least in part on at least one of a reference point associated with the resource allocation or a unit of granularity associated with the resource allocation.

In some aspects, an apparatus for wireless communication may include means for determining that signaling associated with a resource allocation is associated with a service type; and means for identifying a time-domain resource, for a transmission associated with the service type, in connection with determining that the signaling associated with the resource allocation is associated with the service type, wherein the time-domain resource is identified based at least in part on at least one of a reference point associated with the resource allocation or a unit of granularity associated with the resource allocation.

In some aspects, a method of wireless communication, performed by a base station (BS), may include determining signaling for a time-domain resource allocation for a transmission associated with a service type to or from a UE based at least in part on determining the UE can communicate using the service type; and transmitting the signaling, wherein the time-domain resource is identified based at least in part on at least one of a reference point associated with the resource allocation or a unit of granularity associated with the resource allocation.

In some aspects, a base station for wireless communication may include memory and one or more processors coupled to the memory. The memory and the one or more processors may be configured to determine signaling for a time-domain resource allocation for a transmission associated with a service type to or from a UE based at least in part on determining the UE can communicate using the service type; and transmit the signaling, wherein the time-domain resource is identified based at least in part on at least one of a reference point associated with the resource allocation or a unit of granularity associated with the resource allocation.

In some aspects, a non-transitory computer-readable medium may store one or more instructions for wireless communication. The one or more instructions, when executed by one or more processors of a base station, may cause the one or more processors to determine signaling for a time-domain resource allocation for a transmission associated with a service type to or from a UE based at least in part on determining the UE can communicate using the service type; and transmit the signaling, wherein the time-domain resource is identified based at least in part on at least one of a reference point associated with the resource allocation or a unit of granularity associated with the resource allocation.

In some aspects, an apparatus for wireless communication may include means for determining signaling for a time-domain resource allocation for a transmission associated with a service type to or from a UE based at least in part on determining the UE can communicate using the service type; and means for transmitting the signaling, wherein the time-domain resource is identified based at least in part on at least one of a reference point associated with the resource allocation or a unit of granularity associated with the resource allocation.

In some aspects, a method of wireless communication, performed by a user equipment (UE), may include receiving, by the user equipment, a configuration of time-domain resource allocation parameters comprising a first set of parameters associated with a first service type, and a second set of parameters associated with a second service type, wherein the first service type and the second service type are associated with different transmission time interval (TTI) durations; receiving control information comprising a resource allocation; determining at least one time-domain resource allocation parameter associated with the resource allocation based at least in part on the configuration and whether the resource allocation is for the first service type or the second service type; and communicating with a base station in accordance with the resource allocation and the at least one time-domain resource allocation parameter.

In some aspects, a user equipment for wireless communication may include memory and one or more processors coupled to the memory. The memory and the one or more processors may be configured to receive, by the user equipment, a configuration of time-domain resource allocation parameters comprising a first set of parameters associated with a first service type, and a second set of parameters associated with a second service type, wherein the first service type and the second service type are associated with different transmission time interval (TTI) durations; receive control information comprising a resource allocation; determine at least one time-domain resource allocation parameter associated with the resource allocation based at least in part on the configuration and whether the resource allocation is for the first service type or the second service type; and communicate with a base station in accordance with the resource allocation and the at least one time-domain resource allocation parameter.

In some aspects, a non-transitory computer-readable medium may store one or more instructions for wireless communication. The one or more instructions, when executed by one or more processors of a user equipment, may cause the one or more processors to receive, by the user equipment, a configuration of time-domain resource allocation parameters comprising a first set of parameters associated with a first service type, and a second set of parameters associated with a second service type, wherein the first service type and the second service type are associated with different transmission time interval (TTI) durations; receive control information comprising a resource allocation; determine at least one time-domain resource allocation parameter associated with the resource allocation based at least in part on the configuration and whether the resource allocation is for the first service type or the second service type; and communicate with a base station in accordance with the resource allocation and the at least one time-domain resource allocation parameter.

In some aspects, an apparatus for wireless communication may include means for receiving, by the user equipment, means for receiving a configuration of time-domain resource allocation parameters comprising a first set of parameters associated with a first service type, and a second set of parameters associated with a second service type, wherein the first service type and the second service type are associated with different transmission time interval (TTI) durations; means for receiving control information comprising a resource allocation; means for determining at least one time-domain resource allocation parameter associated with the resource allocation based at least in part on the configuration and whether the resource allocation is for the first service type or the second service type; and means for communicating with a base station in accordance with the resource allocation and the at least one time-domain resource allocation parameter.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
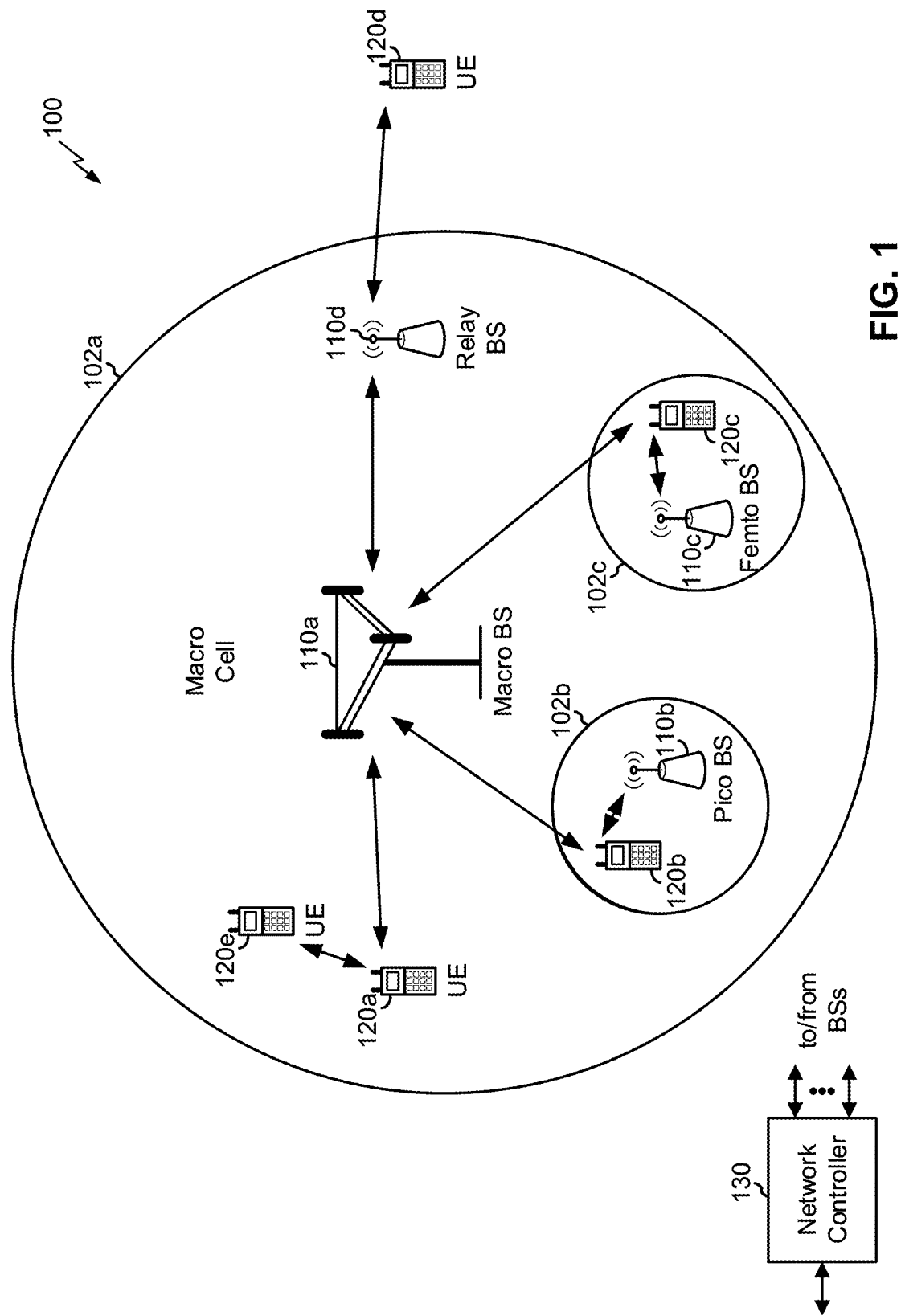
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
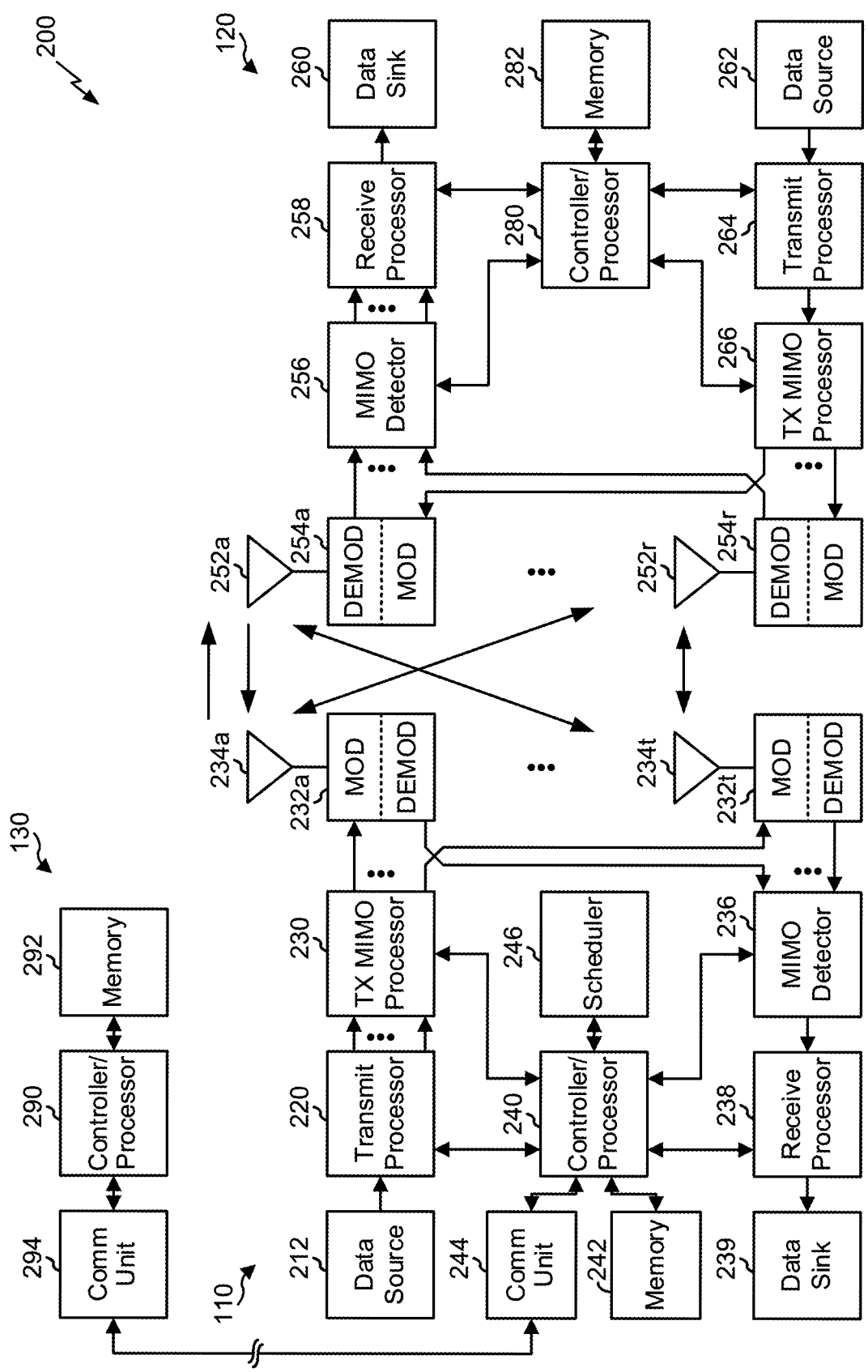
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with signaling for sub-slot time-domain resource allocation, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that signaling associated with a resource allocation is associated with a service type; means for identifying a time-domain resource, for a transmission associated with the service type, in connection with determining that the signaling associated with the resource allocation is associated with the service type, wherein the time-domain resource is identified based at least in part on at least one of a reference point associated with the resource allocation or a unit of granularity associated with the resource allocation; means for receiving a configuration of time-domain resource allocation parameters comprising a first set of parameters associated with the first service type and a second set of parameters associated with a second service type, wherein identifying the time-domain resource is based at least in part on the configuration; and/or the like. In some aspects, such means may include one or more components of UE 120 described in connection with FIG. 2.

In some aspects, base station 110 may include means for determining signaling for a time-domain resource allocation for a transmission associated with a service type to or from a user equipment (UE) based at least in part on determining the UE can communicate using the service type; means for transmitting the signaling, wherein the time-domain resource is identified based at least in part on at least one of a reference point associated with the resource allocation or a unit of granularity associated with the resource allocation; and/or the like. In some aspects, such means may include one or more components of base station 110 described in connection with FIG. 2.

In some aspects, UE 120 may include means for receiving, by the UE 120, a configuration of time-domain resource allocation parameters comprising a first set of parameters associated with a first service type, and a second set of parameters associated with a second service type, wherein the first service type and the second service type are associated with different transmission time interval (TTI) durations; means for receiving control information comprising a resource allocation; means for determining at least one time-domain resource allocation parameter associated with the resource allocation based at least in part on the configuration and whether the resource allocation is for the first service type or the second service type; means for communicating with a base station in accordance with the resource allocation and the at least one time-domain resource allocation parameter; and/or the like. In some aspects, such means may include one or more components of UE 120 described in connection with FIG. 2.

As indicated above, FIG. 2 is provided as an example. Other examples may differ from what was described with regard to FIG. 2.

Figure 3A:
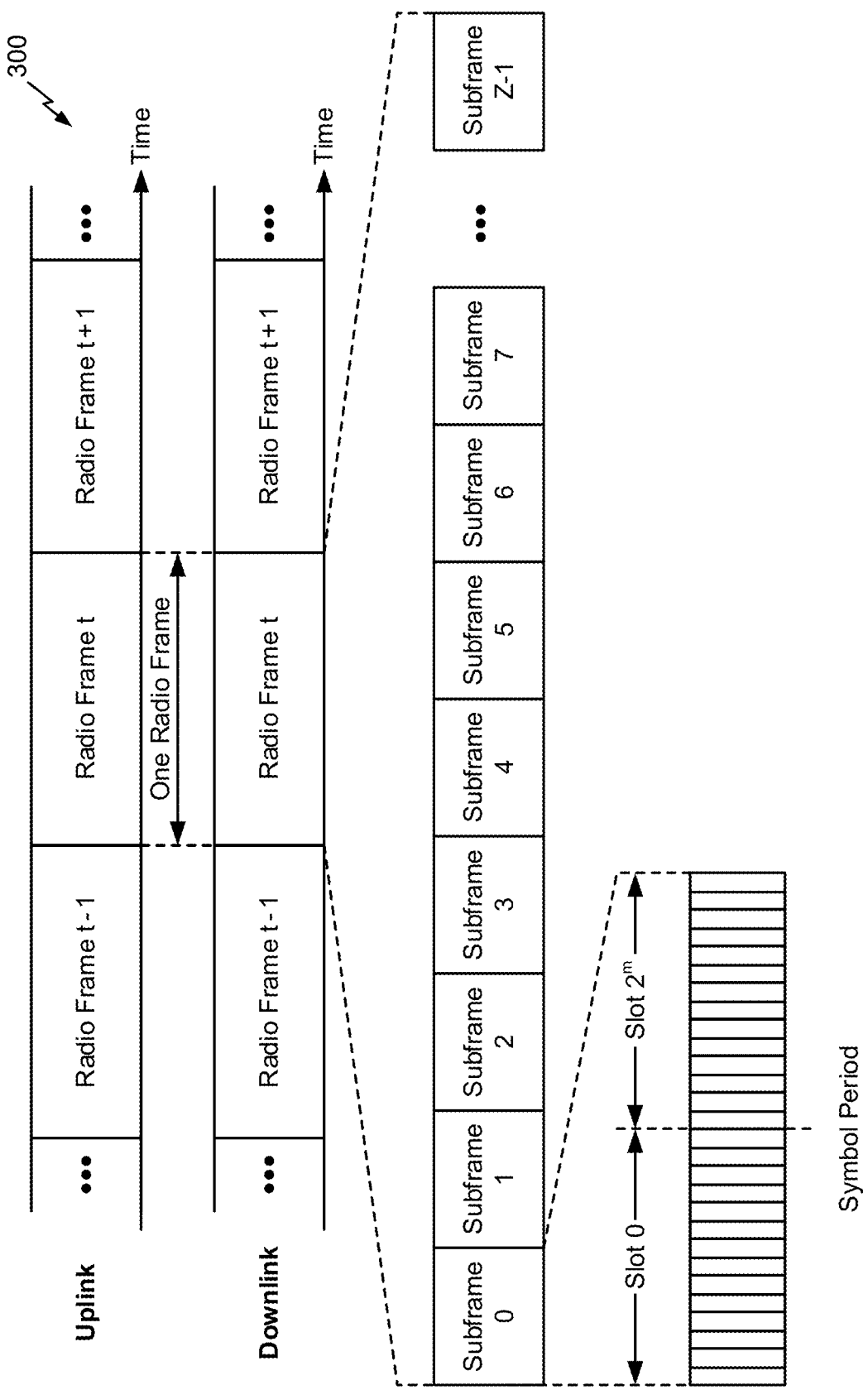
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
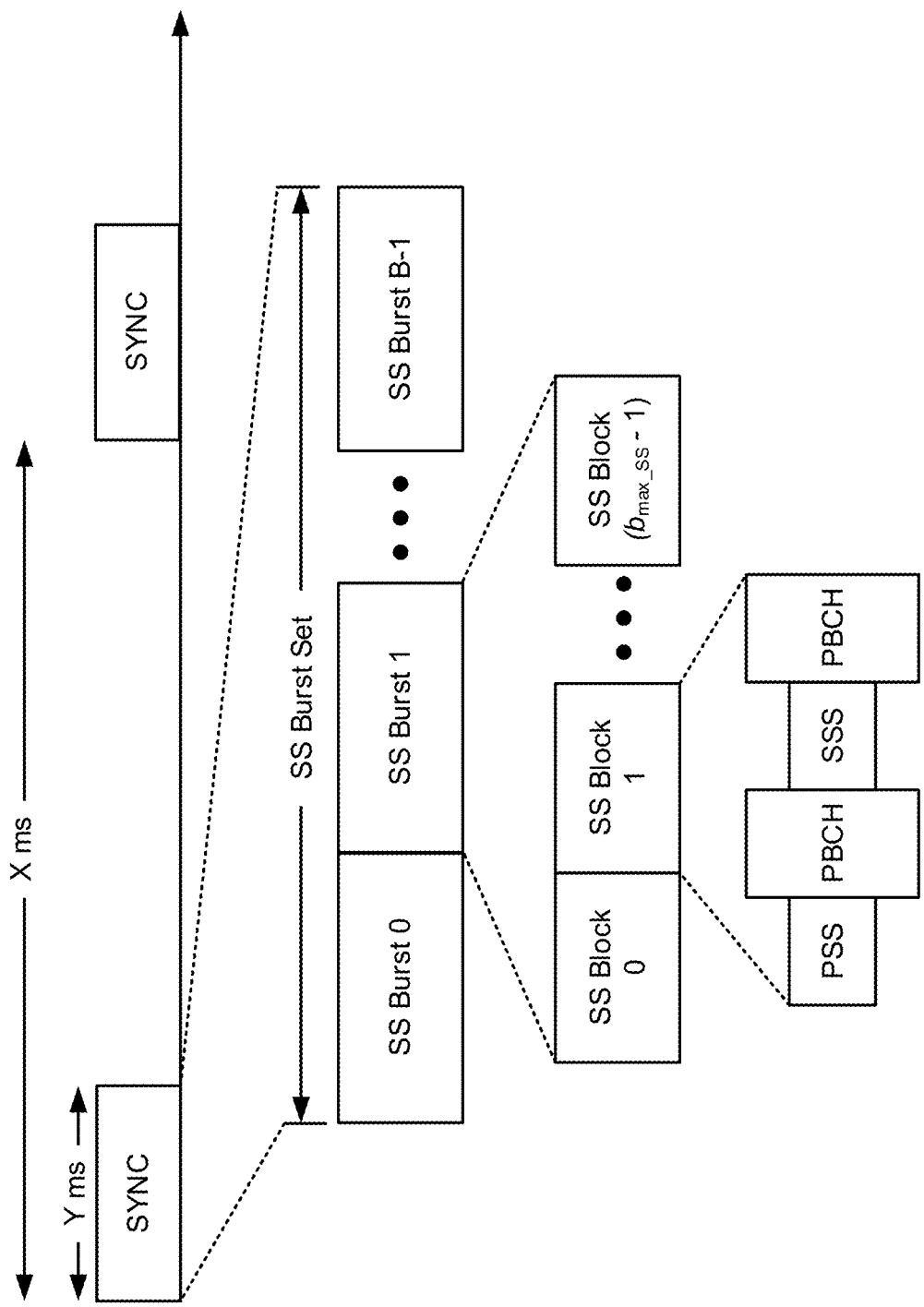
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
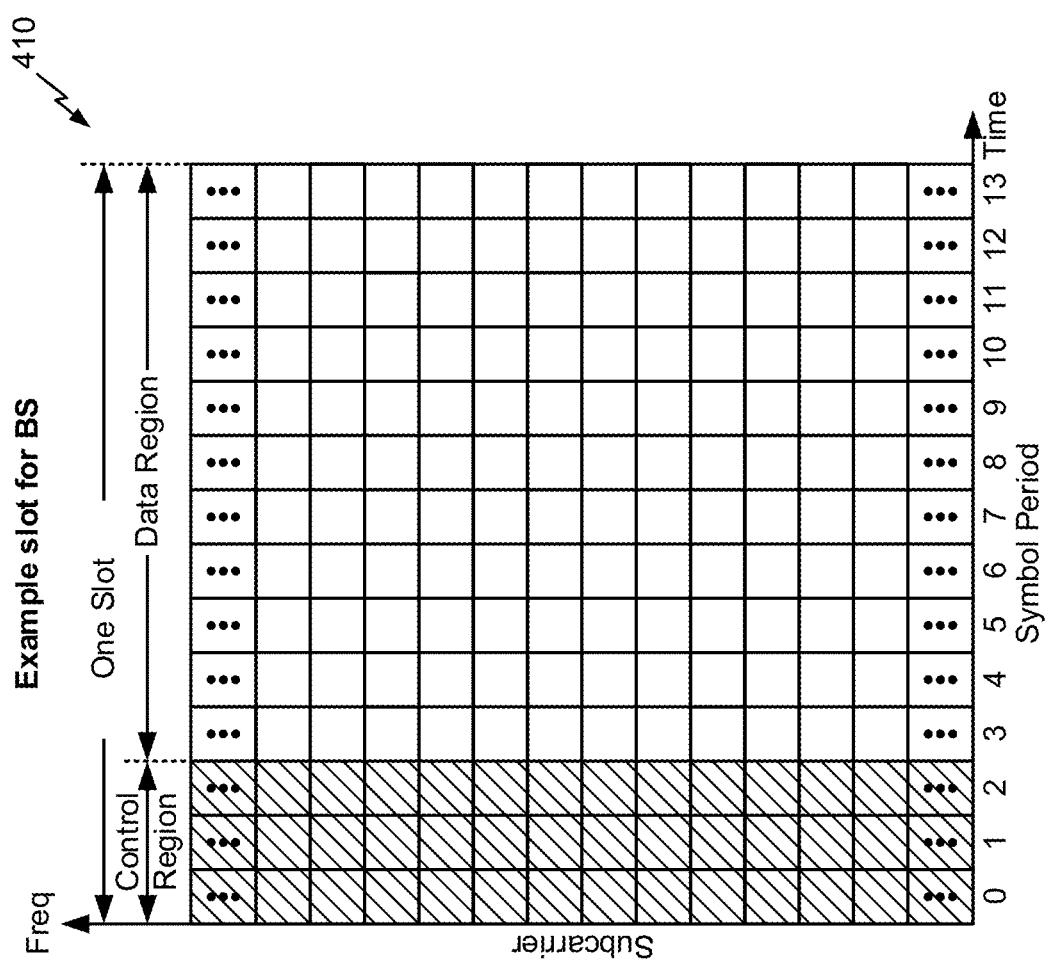
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. NR may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5A:
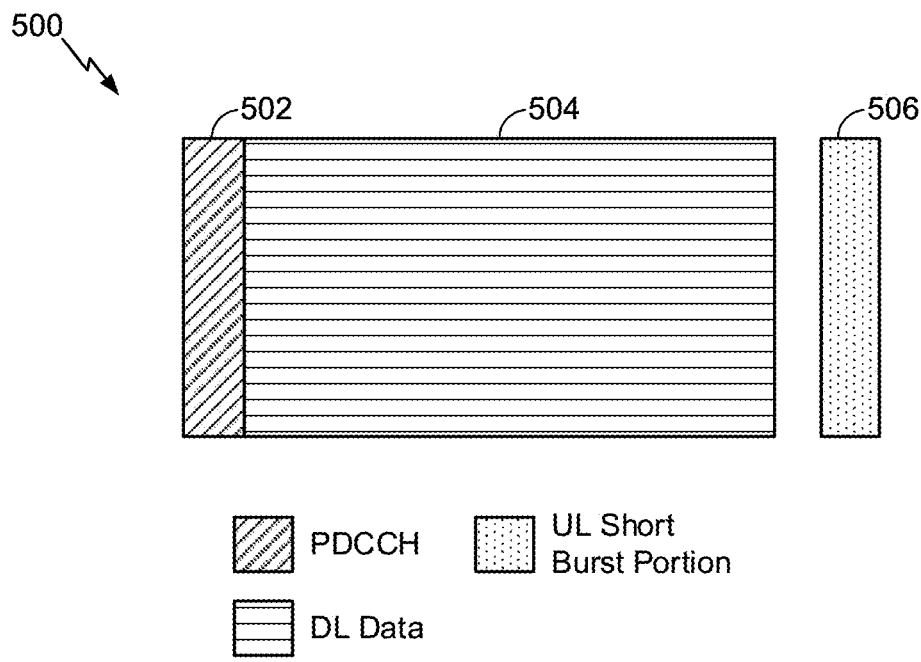
FIG. 5A is a diagram illustrating an example of a DL-centric wireless communication structure in accordance with various aspects of the present disclosure.

FIG. 5A is a diagram 500 showing an example of a DL-centric wireless communication structure in accordance with various aspects of the present disclosure. The DL-centric wireless communication structure (referred to hereinafter as a DL-centric slot) may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5A.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5A, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

Figure 5B:
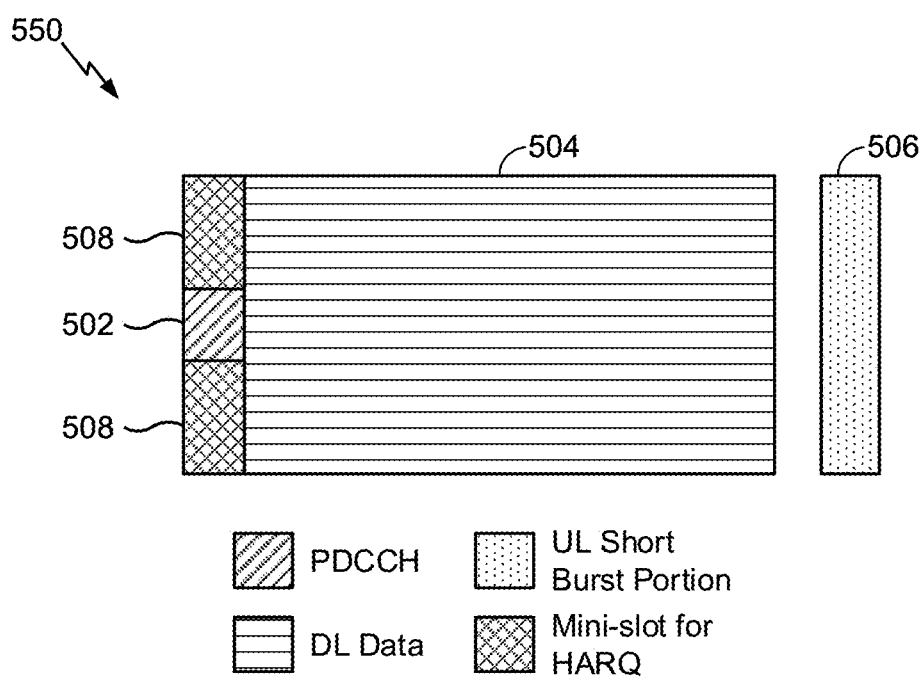
FIG. 5B is a diagram illustrating an example of a DL-centric wireless communication structure that includes one or more mini-slots within a downlink common burst portion of the wireless communication structure.

In some aspects, the DL-centric slot may include one or more mini-slots in, for example, the control portion 502. FIG. 5B is a diagram 550 illustrating an example of a DL-centric slot that includes one or more mini-slots 508 within the control portion 502 (sometimes referred to as a DL common burst portion 502) of the DL-centric slot.

The mini-slot 508 is a unit of scheduling in NR that is smaller than a slot (i.e., a portion of the slot). For example, while an enhanced mobile broadband (eMBB) slot may include 14 symbols, the mini-slot 508 may include fewer than 14 symbols (e.g., one symbol, two symbols, four symbols, and/or the like). In some aspects, the mini-slot 508 may include one or more data symbols that represent data.

Additionally, or alternatively, the mini-slot 508 may include one or more control symbols that represent control information associated with the mini-slot 508. In some aspects, the one or more control symbols may be at or near a beginning of the mini-slot 508 (e.g., in the first two symbols of the mini-slot) or at or near an end of the mini-slot 508 (e.g., in the last symbol of the mini-slot.) Alternatively, the mini-slot 508 may not include a control symbol.

Additionally, or alternatively, the mini-slot 508 may include a reference symbol that carries information associated with demodulating data included in the mini-slot 508 (e.g., a DMRS). In some aspects, the reference symbol may be at any location within the mini-slot 508 (e.g., in a first symbol, a second symbol, a third symbol, a last symbol, and/or the like). In some aspects, the reference symbol and the control symbol may be the same symbol (i.e., a single symbol may carry the control information and the information associated with demodulating data included in the mini-slot 508).

In some aspects, the inclusion of the reference symbol in the mini-slot 508 may permit a reference symbol to be omitted from a portion of the DL data portion 504. For example, assume that the mini-slot 508 carries first data destined for a particular UE and the portion of the DL data portion 504, that uses a same frequency band as the mini-slot 508, carries second data destined for the particular UE. Here, if the mini-slot 508 includes the reference symbol, then the portion of the DL data portion 504 may not include the reference symbol. In this example, the particular UE may use the reference symbol included in the mini-slot 508 to demodulate the second data carried in the portion of the DL data portion 504. Omitting the reference symbol from the portion of the DL data portion 504 may provide for reduced latency since the particular UE may demodulate, and there-after acknowledge, receipt of the second data without buffering the second data carried in the portion of the DL data portion 504.

Alternatively, the mini-slot 508 may not include a reference symbol. For example, assume that the mini-slot 508 carries first data destined for a particular UE, and a portion of the DL data portion 504 that uses a same frequency band as the mini-slot 508 carries second data destined for the particular UE. Here, the mini-slot 508 may not include the reference symbol when the reference symbol is included in the portion of the DL data portion 504 that carries the second data. In this example, the particular UE may buffer the first data carried in the mini-slot 508, and demodulate the first data after receiving the reference symbol in the portion of the DL data portion 504. Omitting the reference symbol from the mini-slot 508 may provide for improved robustness to mobility of the particular UE since the reference symbol is received later (e.g., near the middle) of the transmission of the first data and the second data to the particular UE.

In some aspects, the mini-slot 508 may have a subcarrier spacing that is the same as a subcarrier spacing of the slot in which the mini-slot 508 is included. Alternatively, the mini-slot 508 may have a subcarrier spacing that differs from the subcarrier spacing of the slot in which the mini-slot 508 is included. In some aspects, increasing the subcarrier spacing of the mini-slot 508 relative to the subcarrier spacing of the slot may allow for additional symbols to be included in the mini-slot 508. For example, if the mini-slot 508 has a same subcarrier spacing as the slot (e.g., 30 kilohertz (kHz)), then the mini-slot 508 may include a particular number of symbols (e.g., 2 symbols). However, if the mini-slot 508 has a subcarrier spacing that is greater than (e.g., two times) the subcarrier spacing (e.g., 2×30 kHz=60 kHz), then the mini-slot 508 may include a greater number (e.g., two times) the particular number of symbols (e.g., 2×2 symbols=4 symbols).

In some aspects, a parameter, associated with transmitting data in the mini-slot 508, may be different than a parameter associated with transmitting data in the DL data portion 504. For example, a MCS associated with data included in the mini-slot 508 (e.g., a modulation order, a coding rate, a HARQ configuration, and/or the like) may be different from a MCS associated with data included in the DL data portion 504. As another example, a number of MIMO layers, associated with the data included in the mini-slot 508, may be different from a number of MIMO layers associated with the data included in the DL data portion 504.

As shown in FIG. 5B, in some aspects, a mini-slot 508 may be included in the control portion 502 (e.g., the DL common burst portion 502) of the DL-centric slot. In some aspects, the mini-slot 508 may be used to transmit data to a particular UE. As such, in some aspects, the mini-slot 508 may include hybrid automatic repeat request (HARQ) data (e.g., data associated with a HARQ transmission, like a retransmission, of a HARQ process), while the remainder of the control portion 502 may not include HARQ data.

In some aspects, the mini-slot 508 may be associated with transmitting data to a particular UE and may utilize one or more ranges of frequencies. For example, the mini-slot 508 may utilize a particular range of frequencies of the slot (e.g., a highest 30 megahertz (MHz) when a slot has a range of 80 MHz) to transmit data to the particular UE, while the DL common burst portion 502 may utilize a different range of frequencies of the slot (e.g., the remaining 50 MHz of the 80 MHz slot) to transmit control information to multiple UEs. As another example, the mini-slot 508 may utilize a first range of frequencies of the slot (e.g., the highest 30 MHz of the 80 MHz slot range) and a second range of frequencies of the slot (e.g., a lowest 30 MHz of the 80 MHz slot range) to transmit data to the particular UE, while the DL common burst portion 502 may utilize a third range of frequencies of the slot (e.g., a middle 20 MHz of the 80 MHz slot) to transmit control information to multiple UEs. In some aspects, as shown in FIG. 5B, the first range of frequencies may be separated from the second range of frequencies by the third range of frequencies.

Additionally, or alternatively, different mini-slots 508 may be associated with transmitting data to different UEs and may utilize different ranges of frequencies. For example, a first mini-slot 508 may utilize a first range of frequencies of the slot (e.g., the highest 30 MHz of the 80 MHz slot range) to transmit first data to a first particular UE, while a second mini-slot 508 may utilize a second range of frequencies of the slot (e.g., the lowest 30 MHz of the 80 MHz slot range) to transmit second data to a second particular UE. Here, the DL common burst portion 502 may utilize a third range of frequencies of the slot (e.g., the middle 20 MHz of the 80 MHz slot) to transmit control information to multiple UEs.

As indicated above, FIGS. 5A and 5B are provided merely as examples. Other examples may differ from what was described with regard to FIGS. 5A and 5B. Further, while FIGS. 5A and 5B relate to DL-centric slots that may be used for NR technology, another type of radio access technology (e.g., LTE) may use a subframe for a similar purpose and/or in a similar manner as that described in association with the DL-centric slots of FIGS. 5A and 5B.

Figure 6A:
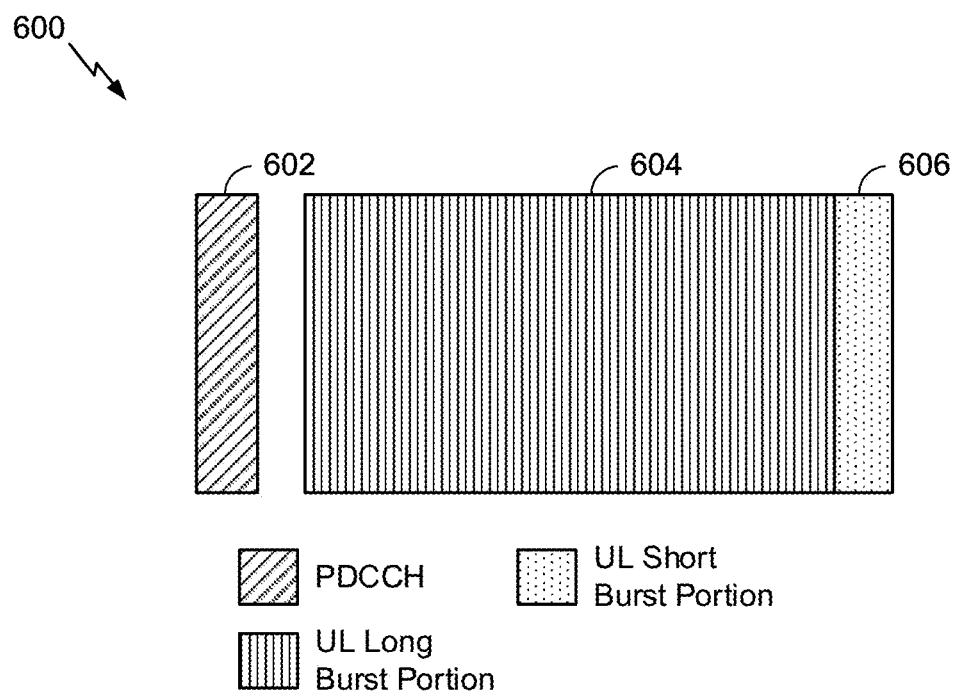
FIG. 6A is a diagram illustrating an example of a UL-centric wireless communication structure in accordance with various aspects of the present disclosure.

FIG. 6A is a diagram 600 showing an example of an UL-centric wireless communication structure in accordance with various aspects of the present disclosure. The UL-centric wireless communication structure (referred to hereinafter as an UL-centric slot) may include a control portion 602. The control portion 602 may exist in the initial or beginning portion of the UL-centric slot. The control portion 602 in FIG. 6A may be similar to the control portion 502 described above with reference to FIG. 5A. In some configurations, the control portion 602 (sometimes referred to as DL common burst portion 602) may be a physical DL control channel (PDCCH).

The UL-centric slot may also include an UL long burst portion 604. The UL long burst portion 604 may sometimes be referred to as the payload of the UL-centric slot. The UL long burst portion 604 may refer to the communication resources utilized to communicate UL data from the subordinate entity (e.g., UE) to the scheduling entity (e.g., UE or BS).

As illustrated in FIG. 6A, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6A may be similar to the UL short burst portion 506 described above with reference to FIG. 5A, and may include any of the information described above in connection with FIG. 5A. The foregoing is merely one example of an UL-centric wireless communication structure and alternative structures having similar features may exist without necessarily deviating from the aspects described herein.

Figure 6B:
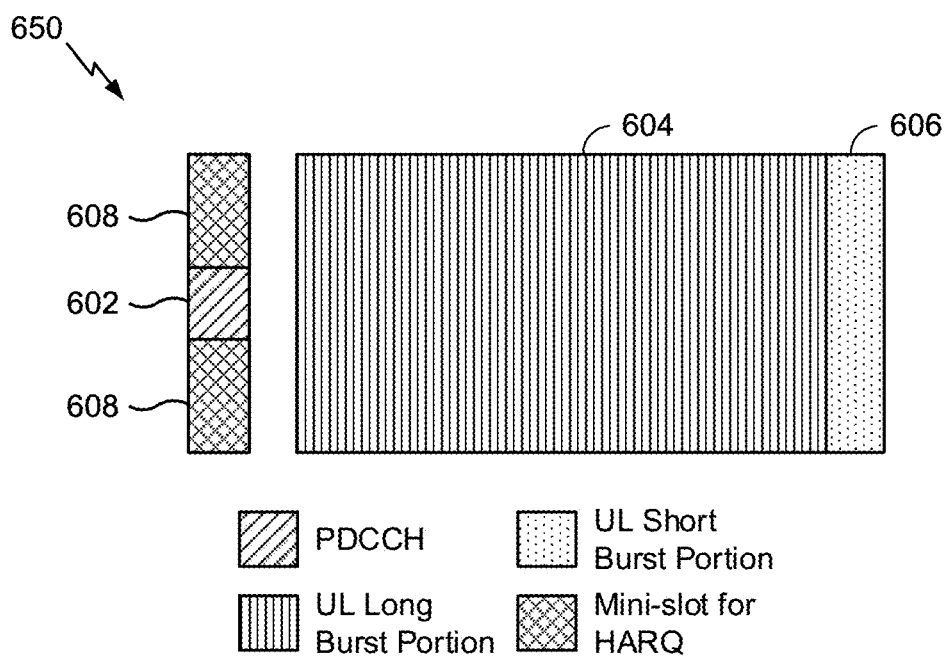
FIG. 6B is a diagram illustrating an example of a UL-centric wireless communication structure that that includes one or more mini-slots within a downlink common burst portion of the wireless communication structure.

In some aspects, the UL-centric slot may include one or more mini-slots in, for example, the control portion 602. FIG. 6B is a diagram 650 illustrating an example of a UL-centric slot that includes one or more mini-slots 608 within the control portion 602 (sometimes referred to as a DL common burst portion 602) of the UL-centric slot. The mini-slot 608 in FIG. 6B may be similar to the mini-slot 508 described above with reference to FIG. 5B, and may include any information described in connection with FIG. 5B. The foregoing is merely one example of an UL-centric wireless communication structure that includes one or more mini-slots, and alternative structures having similar features may exist without necessarily deviating from the aspects described herein. Details regarding scheduling of mini-slots 608 within a UL-centric slot for transmission of HARQ data to a UE are described below.

As indicated above, FIGS. 6A and 6B are provided merely as examples. Other examples may differ from what is described with regard to FIGS. 6A and 6B. Further, while FIGS. 6A and 6B relate to UL-centric slots that may be used for NR technology, another type of radio access technology (e.g., LTE) may use a subframe for a similar purpose and/or in a similar manner as that described in association with the UL-centric slots of FIGS. 6A and 6B.

In some instances, a UE may be capable of communicating using two or more service types of traffic, such as an enhanced mobile broadband (eMBB) service type, an ultra-reliable low latency communication (URLLC) service type, and/or the like. In such cases, similar signaling for time-domain resource allocation may be performed between the UE and a BS for two or more different service types. For example, slot-based signaling operations may be performed for both eMBB and URLLC service types for time-domain resource allocation. In some cases, signaling for time-domain resource allocation may occur once per slot (e.g., every 14 symbols, at best). Accordingly, for transmissions using URLLC service, the time-domain resource allocation may be redundant and/or sub-optimal with respect to the presence of multiple URLLCs within a single slot. As such, for URLLC, which is capable of operating at a more granular level (e.g., using mini-slots or symbols) than eMBB, the signaling for the time-domain resource allocation may be redundant. For example, multiple URLLCs within a same slot may identify a same slot for time-domain resource allocation (because the time-domain resource allocation is slot-based). Furthermore, the time-domain resource allocation may not be best suited for all URLLCs of a slot. For example, circumstances or characteristics may change between symbols of a slot. As such, it may be beneficial to adjust and/or adapt the time-domain resource allocation for subsequent URLLCs. Accordingly, some examples herein use symbol-based (rather than a slot-based) signaling. As such, time-domain resources can potentially be allocated every symbol, rather than every slot.

Time-domain resource allocations may include a plurality of indicators to allocate the time-domain resources for a communication, such as a PDSCH, PUCCH, PUSCH, and/or the like. Such indicators may be associated with one or more reference points or timings of the URLLC exchange or service. For example, timing values K0, K1, and K2 (which may be referred to generally as a "K timing" and collectively herein as "K timings") may refer to various times or reference points of a URLLC exchange. As used herein, K0 refers to a timing between a downlink resource grant on a PDCCH and a downlink data transmission on a PDSCH, K1 refers to timing between a downlink data transmission on the PDSCH and a hybrid automatic repeat request acknowledgment (HARQ-ACK) transmission on a physical uplink control channel (PUCCH), and K2 refers to timing between an uplink resource grant on the PDCCH and uplink data transmission on the PUSCH. "Uplink ACK/NACK transmission" is used interchangeably with "HARQ-ACK transmission" herein. Furthermore, the time-domain resource allocation may be defined by a starting symbol (e.g., a starting OFDM symbol) relative to a reference point such as a symbol (not relative to a slot as used in previous techniques or for eMBB) and can be dynamically signaled (e.g., within DCI). Furthermore, the time-domain resource allocation may be defined by a duration of the transmission (e.g., in symbols or mini-slots), which can be dynamically signaled (e.g., within DCI) or semi-statically signaled (e.g., within an RRC configuration). Still further, in some cases, a unit of granularity for the time-domain resource allocation may be signaled.

A UE processing time may be referred to in numbers of symbols (e.g., N0, N1, N2). As used herein, N0 corresponds to the minimum number of OFDM symbols from an end of PDCCH reception to a start of PDSCH required for UE processing, N1 corresponds to the minimum number of OFDM symbols from an end of PDSCH reception to the earliest possible start of the corresponding ACK/NACK required for UE processing, and N2 corresponds to the number of OFDM symbols from an end of PDCCH containing a UL grant to an earliest possible start of the corresponding PUSCH transmission from the UE required for UE processing. In NR, PDCCH/PDSCH can start from a same OFDM symbol, and therefore N0=0. Additionally, a UE may not be expected to transmit anything in the uplink if K1 and K2 are set without leaving sufficient time for UE processing.

Accordingly, some examples herein provide for time-domain resource allocation at the symbol level to enable some service types, such as URLLC, to achieve increased reliability and lower latency. As such, performance for time-domain resource allocation for URLLC services can be enhanced relative to previous techniques. In some examples, signaling may combine two indicators (e.g., K0/K1/K2 and N0/N1/N2) to provide a new indicator that includes both the K timings and a starting OFDM symbol. As such, network resources may be conserved by using a single indicator (rather than multiple indicators) for signaling the time-domain resource allocation.

It should be noted that the techniques described herein can be applied for UEs that use two or more service types of traffic (e.g., URLLC and eMBB, or different combinations of service types), as well as for UEs that use a single service type (e.g., a URLLC-only UE and/or the like).

Figure 7:
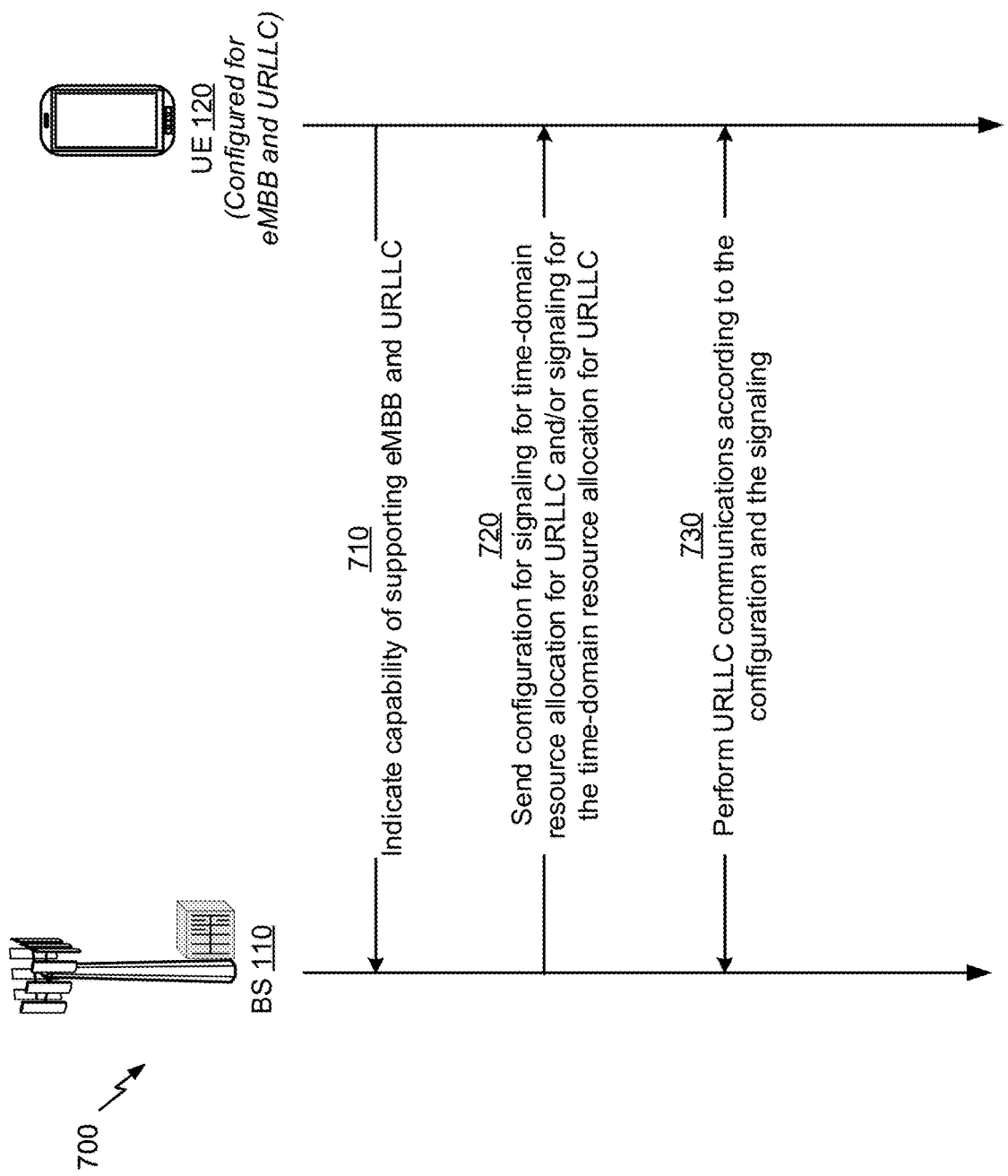
FIGS. 7-9 are diagrams illustrating examples of signaling for sub-slot time-domain resource allocation, in accordance with various aspects of the present disclosure.

FIG. 7 is a diagram illustrating an example 700 of performing signaling for time-domain resource allocation, in accordance with various aspects of the present disclosure. In example implementation 700, a UE 120 is capable of communicating with a BS 110 via eMBB and URLLC services. While FIG. 7 and other examples described herein may be described with reference to URLLC and eMBB services, this is by way of example only. It is to be understood that the techniques described herein can be applied for any one or more service types, and may achieve finer time granularity for scheduling communications in the one or more service types, particularly in the context of the mini-slot. For example, the techniques described in connection with FIG. 7 and elsewhere herein can be applied for a UE capable of using only a single service type, such as URLLC.

As shown in FIG. 7, and by reference number 710, UE 120 may indicate to BS 110 that UE 120 can communicate with BS 110 via eMBB and URLLC services. For example, UE 120 may indicate that UE 120 can communicate with BS 110 using at least two service types (e.g., eMBB, URLLC, and/or the like). For example, once UE 120 comes within range of BS 110 (e.g., during a handoff), when establishing the communication link, UE 120 may indicate that UE 120 can communicate via eMBB and/or URLLC. As such, BS 110 may be notified that UE 120 can communicate via a URLLC service. Therefore, in order to take advantage of the enhanced performance capability of URLLC versus eMBB, BS 110 may provide a configuration to UE 120 to enable UE 120 to interpret signaling of time-domain resource allocations received from BS 110.

As further shown in FIG. 7, and by reference number 720, BS 110 may send the configuration for signaling for time-domain resource allocation for URLLC service and/or the signaling for the time-domain resource allocation for URLLC. In some aspects, the configuration may be provided via radio resource control (RRC) signaling. In some instances, the configuration may indicate that the K timings in the signaling for the time-domain resource allocation refer to symbols of the URLLC (rather than slots). Additionally, or alternatively, the RRC signaling may include a mini-slot duration such that UE 120 may be configured with a mini-slot duration for URLLC exchanges. In some aspects, the RRC signaling may indicate a unit of granularity for the time-domain resource allocation, such as symbols, mini-slots, a size of a mini-slot, and/or the like.

In some aspects, the configuration may include sets of parameters for each type of service that UE 120 can use to communicate with BS 110. Accordingly, the configuration may include a first set of parameters associated with a first service type (e.g., eMBB) and a second set of parameters associated with a second service type (e.g., URLLC). The first set of parameters may include one or more slot-based time-domain resource allocation parameters, and the second set of parameters may include one or more symbol-based time-domain resource allocation parameters. The two types of services may have different transmission time interval (TTI) durations. For example, URLLC may have a shorter TTI than eMBB. Furthermore, the first service type may be associated with a slot-based duration with a first number of OFDM symbols and the second service type is associated with a mini-slot-based (or non-slot based) TTI duration with a second number of OFDM symbols that is less than the first number of OFDM symbols. In some aspects, the control information may indicate the TTI duration or a unit of granularity for the control information may be based at least in part on the TTI duration. In some aspects, the configuration and/or signaling may include control information (e.g., DCI) with a resource allocation.

The example configuration from BS 110 (or signaling) may include one or more tables within indices and corresponding values identifying the K timings. As examples, the following example Table 1 may be used and/or provided when UE 120 is not configured with a mini-slot duration (e.g., a mini-slot duration was not provided to UE 120):

TABLE 1

| Index | Value |
|---|---|
| 0 | x0 symbols (or default value) |
| 1 | x1 symbols |
| 2 | x2 symbols |

TABLE 1-continued

| Index | Value |
|---|---|
| 3 | x3 symbols |
| ... | ... | and the following example Table 2 may be used and/or provided when UE 120 is configured with a mini-slot duration (which may be indicated in an RRC configuration from BS 110):

TABLE 2

| Index | Value |
|---|---|
| 0 | x0 symbols (or default value) |
| 1 | x1 symbols |
| 2 | 1 mini-slot |
| 3 | 2 mini-slot |
| ... | ... | wherein the index is for a K timing that may be provided within DCI associated with a URLLC transmission. In some aspects, a plurality of tables may be provided corresponding to each of the K timings. Accordingly, there may be a first table for K0, a second table for K1, and a third table for K2. Therefore, when a DCI includes signaling for K0, UE 120 may refer to the table for K0; when the DCI includes signaling for K1, UE 120 may refer to the table for K1; and when the DCI includes scheduling for K2, UE may refer to the able for K2.

The above tables are provided by way of example only. In some aspects, the table that is used may not necessarily contain both symbol-level K indication and mini-slot level K indication. For example, the table may contain only the mini-slot-level K timing indication.

In some aspects, the configuration may include default values for the K timings. For example, default values, as indicated in RRC signaling, may be K0=0, K1=N1 or K1=N1+1, and K2=N2, or K2=N2+1. As such, the default values will be used if the DCI does not contain the corresponding field for the K timing.

In some aspects, a PDSCH-to-HARQ-feedback field may signal an offset from N1 to a start of the HARQ-ACK feedback field. For example, in this case, the signaling may indicate an offset from a symbol identified by a UE's N1 value to the start of a PUCCH to be used for the UE's HARQ-ACK feedback.

As further shown by reference number 720, BS 110 may send signaling for the time-domain resource allocation for URLLC. For example, BS 110 may dynamically send DCI to UE 120 corresponding to a URLLC transmission. In some examples, the DCI may include the signaling (e.g., K timings) for the time-domain resource allocation and/or an activation for semi-persistent scheduling (SPS). In such cases, the activation for SPS may include activation for downlink communication and/or activation for uplink transmission with configured grant (e.g., SPS type 2).

In some examples, the signaling may include a duration of a mini-slot for a URLLC. Furthermore, multiple different durations of mini-slots may be provided corresponding to K timings or URLLC transmissions. For example, a duration of a mini-slot for an uplink URLLC may be different than a duration of the mini-slot for a downlink URLLC. In some aspects, the duration of the mini-slot may correspond to a PDCCH monitoring periodicity. For example, if a UE is configured to monitor the PDCCH periodically within a slot, then the length of the time between the start of one PDCCH monitoring occasion and the start of the next PDCCH monitoring occasion could be one mini-slot. In such a case, the UE may determine (e.g., implicitly) that the mini-slot duration is equal to the gap between the start of one PDCCH monitoring occasion and the start of the next PDCCH monitoring occasion. Additionally, or alternatively, the signaling may include a duration (e.g., a mini-slot duration) associated with a PDSCH transmission or PUSCH transmission. In some aspects, the signaling may include a one bit parameter to indicate whether the UE is to cap a URLLC transmission at a boundary of a slot that is to include the URLLC transmission. For example, if the UE is configured with this one bit parameter to cap a URLLC transmission at a boundary of a slot, then the UE is to end the transmission at the slot boundary (i.e., at the end of a slot).

As further shown in FIG. 7, and by reference number 730, BS 110 and UE 120 may perform URLLC communications according to the configuration and the signaling. For example, UE 120 may determine the time-domain resource allocation of URLLC according to the configuration and signaling. Accordingly, UE 120 may receive a URLLC PDSCH from BS 110 and/or transmit a PUCCH and/or PUSCH to BS 110 based at least in part on the time-domain resource allocation. UE 120 may iteratively perform the URLLC using the configuration dynamically (e.g., as DCI is received) and/or semi-statically (e.g., as RRC signaling is received). Accordingly, whenever UE 120 is to communicate with BS 110 via a URLLC service or an eMBB service, UE 120 may use resources identified according to the configuration and/or signaling of the time-domain resource allocation.

In some aspects, UE 120 may identify or determine a time-domain resource allocation parameter associated with a resource allocation based at least in part on the configuration and whether the resource allocation is for a first service type (e.g., eMBB) or a second service type (e.g., URLLC). UE 120 may then communicate with BS 110 in accordance with the resource allocation and the time-domain resource allocation parameter. UE 120 may determine that the configuration or the signaling are associated with a time-domain resource allocation for URLLC. In such cases, UE 120 may determine the configuration and/or signaling are for URLLC based at least in part on receiving the configuration, signaling, and/or other communications via the URLLC service.

In some aspects, UE 120 identifies the time-domain resource for a URLLC transmission in connection with the configuration and/or the signaling. For example, UE 120 may identify a starting OFDM symbol and/or a duration for the URLLC transmission according to the configuration and/or signaling. In some aspects, the starting signal and/or duration may be based at least in part on the K timing(s) included in the DCI. In some aspects, the UE 120 may identify a reference point from which to determine the time-domain resource. For example, the reference point may be based at least in part on a K timing of the UE 120, an N timing of the UE 120, a unit of granularity of the UE 120, and/or the like.

Accordingly, UE 120 may identify and use signaling for URLLC transmissions according to a configuration for time-domain resource allocation that is received from BS 110. As such, the signaling may permit BS 110 and/or UE 120 to schedule and/or transmit URLLC transmissions at the symbol level (rather than the slot level).

As indicated above, FIG. 7 is provided as an example. Other examples may differ from what is described with respect to FIG. 7.

Figure 8:
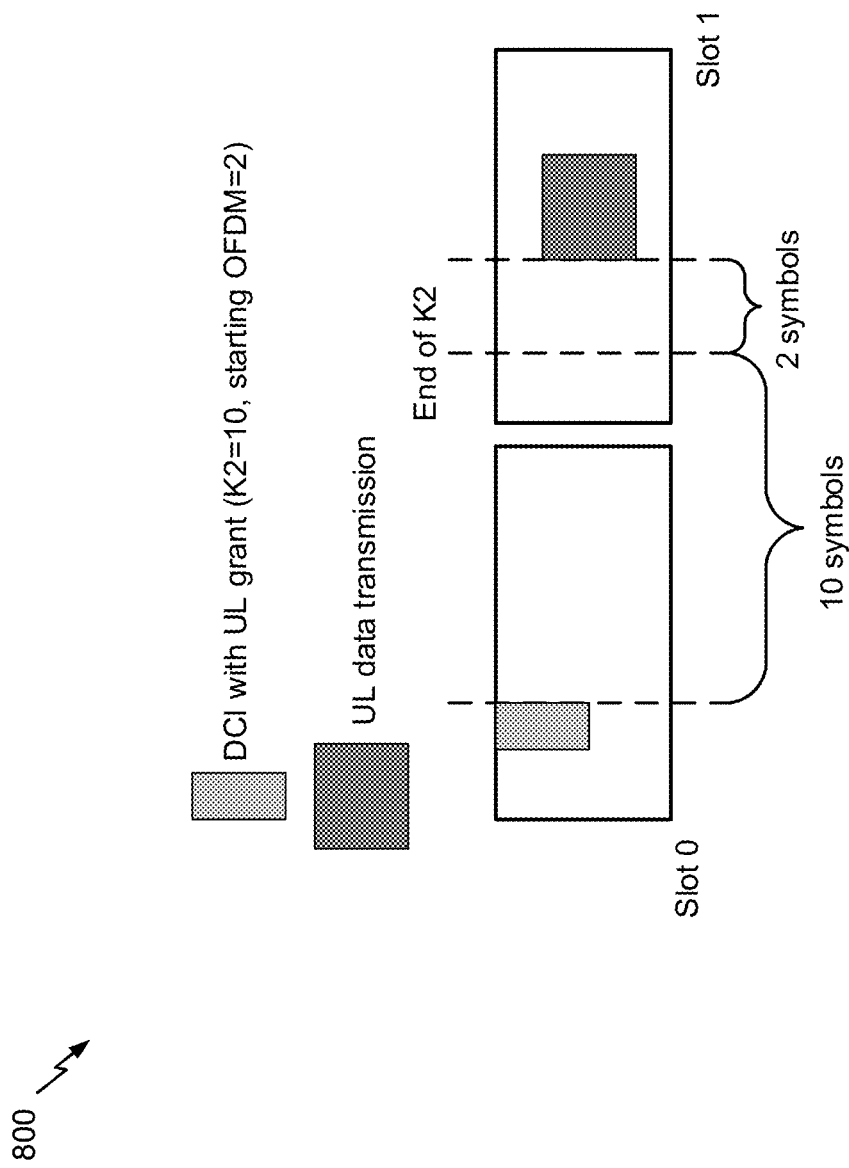

FIG. 8 is a diagram illustrating an example 800 of performing signaling for time-domain resource allocation, in accordance with various aspects of the present disclosure. In example 800, two slots (slot 0 and slot 1) are used (e.g., by UE 120) for a URLLC transmission according to signaling for time-domain resource allocation, as described herein. In FIG. 8, a DCI with an uplink grant is received in slot 0. The example DCI may indicate signaling for K2=10 and a starting OFDM symbol=2. Accordingly, as shown, by example 800, UE 120 may wait 10 symbols after the end of the timing between receiving UL resource grant in the DCI, plus an additional 2 starting symbols from the end of the 10 symbols before sending the uplink data transmission via the URLLC service. Accordingly, the starting OFDM symbol of the scheduled uplink data transmission is determined with respect to the end of K2, rather than the beginning of the next slot (slot 1).

Similarly, in some cases, the UE 120 may identify a starting symbol for a communication based at least in part on a K1 value. For example, the UE 120 may receive a DL grant that schedules a PDSCH transmission and corresponding ACK/NACK feedback for the PDSCH transmission. The DL grant may indicate K1 and a starting symbol of the PUCCH carrying the ACK/NACK feedback. The unit of granularity for K1 may be a mini-slot. Furthermore, the DL grant may indicate the starting symbol with respect to a determined mini-slot. The UE 120 may determine that the transmission of the ACK/NACK feedback starts at the indicated starting symbol in the determined mini-slot. In this case, the UE 120 may identify a starting symbol for ACK/NACK feedback as in a sub-slot (e.g., a mini-slot, a set of symbols) occurring K1 sub-slots after the sub-slot that includes the last symbol of the corresponding PDSCH communication. In one example, for a K1 value of one, the ACK/NACK feedback may be transmitted in the next sub-slot. Based on this value and on a sub-slot configuration (e.g., a unit of granularity for UE 120), for example, UE 120 can determine the sub-slot over which to transmit HARQ-ACK feedback for the PDSCH communication to be the virtual mini-slot that corresponds to a PUCCH transmission opportunity for the next sub-slot after the last symbol of the PDSCH communication is received. In some aspects, UE 120 may transmit the HARQ-ACK transmission starting at the determined starting symbol in the determined mini-slot.

In the example shown in FIG. 8, K2 is signaled in a unit of granularity of symbols. That is, after UE 120 receives the PDCCH with UL grant, the UE 120 waits 10 symbols for K2, and waits for additional number of symbols (2 symbol in this example) after K2 to transmit PUSCH. The example described above involves signaling K1 in a unit of granularity of sub-slots (e.g., mini-slots). For example, after UE 120 receives the PDSCH, UE 120 may wait for 1 mini-slot for K1 (e.g., may go to the next mini-slot after the mini-slot that contains the last symbol of the PDSCH transmission), may wait for one or more additional symbols within the mini-slot, and may transmit the ACK/NACK.

In some implementations, the URLLC transmission may be capped according to the mini-slot duration (e.g., according to RRC signaling). For example, if a mini-slot duration is configured to be 2, then the starting OFDM symbol may be 0 or 1.

As indicated above, FIG. 8 is provided as an example. Other examples may differ from what is described with respect to FIG. 8.

Figure 9:
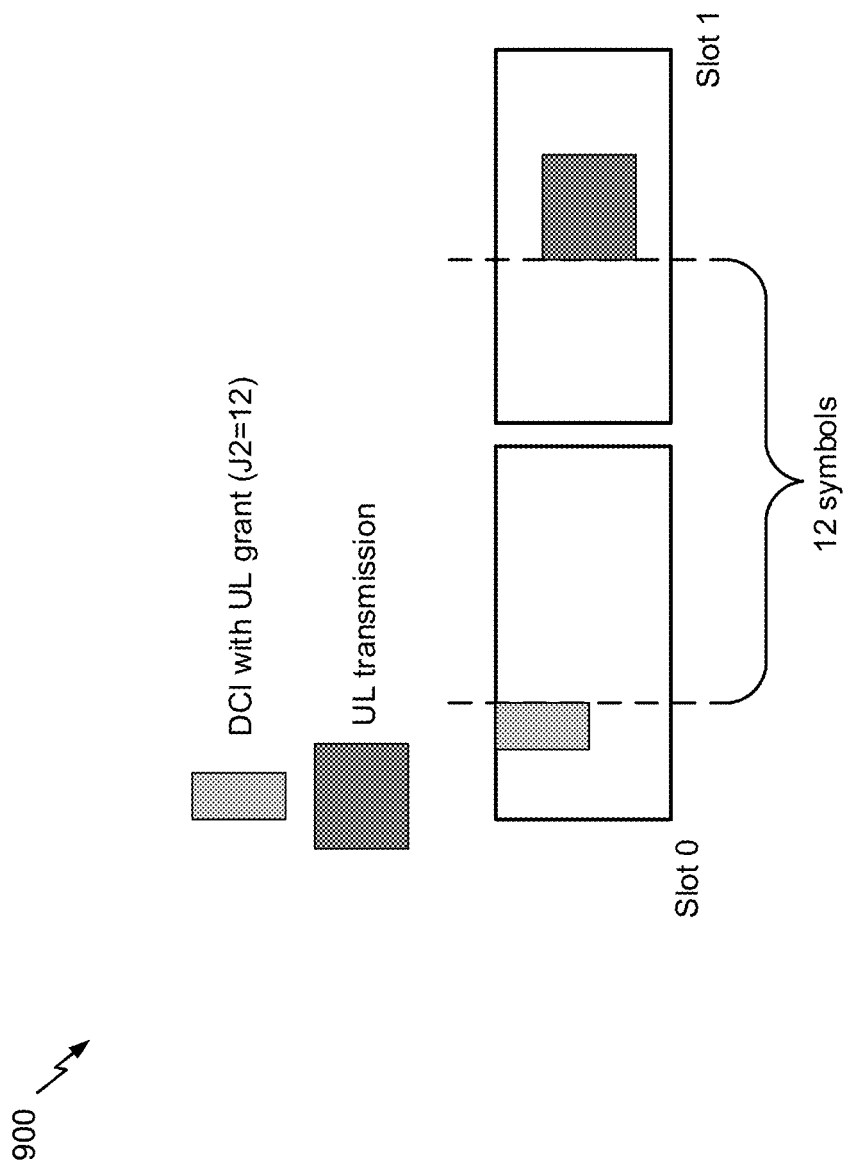

FIG. 9 is a diagram illustrating an example 900 of signaling for time-domain resource allocation, in accordance with various aspects of the present disclosure. In example

900, two slots (slot 0 and slot 1) are used (e.g., by UE 120) for a URLLC transmission according to signaling for time-domain resource allocation, as described herein.

In some aspects, because both the K timings and the starting symbol are defined with respect to a number of symbols, the K timings and starting symbol may be combined into a single indicator (e.g., which may consume fewer bits than separately indicating K timings and the starting symbol). For example, a combination of K timings and the starting symbol parameter may be J, where $J_i=K_i+$starting OFDM symbol. Therefore, J0 may correspond to a number of symbols between the start of PDCCH containing a corresponding downlink grant, and the start of the corresponding PDSCH, J1 correspond to the number of symbols between an end of a PDSCH and the start of the corresponding PUCCH transmission for ACK/NACK, and J2 may correspond to a number of symbols between the end of PDCCH that includes an uplink grant and the start of the PUSCH transmission. In some aspects, RRC signaling may include default values for J0, J1, and J2 (which may be referred to generally as "J timing" or collectively as "J timings"). For example, default values for the J timings may be J0=0, J1=N1 or J1=N1+1, and J2=N2, or J2=N2+1. As such, the default values will be used if the DCI does not contain the corresponding field for the J timing.

In FIG. 9, DCI with an uplink grant is received in slot 0. The example DCI may indicate signaling for J2=12 (rather than both a K timing and a starting symbol parameter). Accordingly, as shown by example 900, UE 120 may wait 12 symbols after the end of the timing between receiving the UL resource grant in the DCI before sending the uplink data transmission via the URLLC service. Similar to the above, the starting symbol for the UL data transmission corresponds to the end of J2, rather than the beginning of the next slot (slot 1).

As indicated above, FIG. 9 is provided as an example. Other examples may differ from what is described with respect to FIG. 9.

Figure 10:
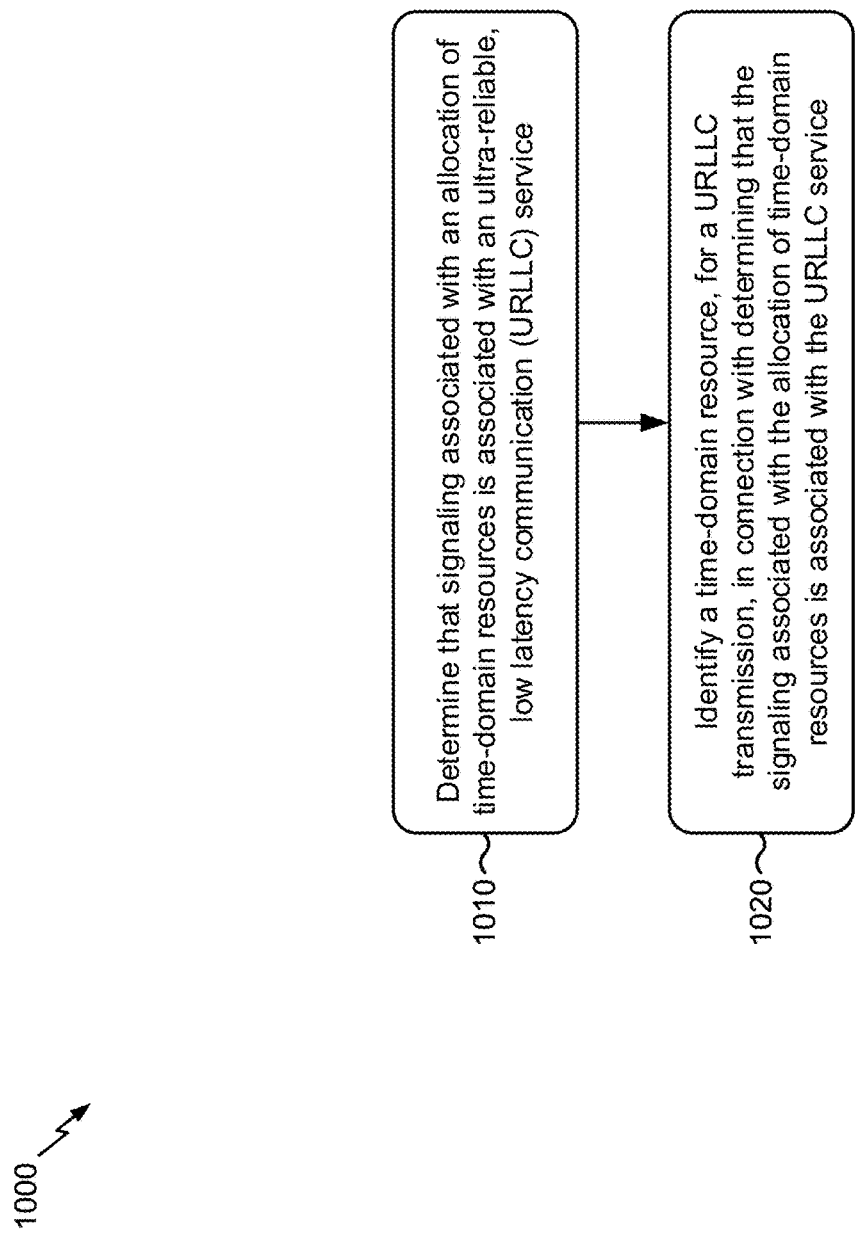
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a user equipment (e.g., UE 120 and/or the like) uses a URLLC service according to a time-domain resource allocation configured specifically for the URLLC service.

As shown in FIG. 10, in some aspects, process 1000 may include determining that signaling associated with an allocation of time-domain resources is associated with a URLLC service (block 1010). For example, UE 120 (e.g., using transmit processor 264, receive processor 258, controller/processor 280, and/or the like) may determine that the signaling is associated with a URLLC service. In some aspects, UE 120 may determine that the signaling is associated with the URLLC service in connection with receiving a packet associated with the URLLC service, receiving the signaling via the URLLC service, and/or the like.

As further shown in FIG. 10, in some aspects, process 1000 may include identifying a time-domain resource, for a URLLC transmission, in connection with determining that the signaling associated with the allocation of time-domain resources is associated with the URLLC service (block 1020). For example, UE 120 (e.g., using transmit processor 264, TX MIMO processor 266, controller/processor 280, and/or the like) may identify the time-domain resource and use the time-domain resource to transmit a URLLC transmission. In some aspects, UE 120 may identify the time-domain resource in connection with determining that the signaling is associated with the URLLC service.

Process 1000 may include additional aspects, such as any single aspect or any combination of aspects described below and/or in connection with one or more other processes described elsewhere herein.

In some aspects, the URLLC transmission comprises at least one of: a physical downlink shared channel (PDSCH) communication, a physical uplink control channel (PUCCH) communication, or a physical uplink shared channel (PUSCH) communication. In some aspects, the signaling identifies at least one of: timing between a downlink resource grant on a physical downlink control channel (PDCCH) and a downlink data transmission on a physical downlink shared channel (PDSCH), timing between a downlink data transmission on the PDSCH and an uplink acknowledgement/negative acknowledgement (ACK/NACK) on a physical uplink control channel (PUCCH), or timing between an uplink resource grant on the PDCCH and uplink data transmission on the PUSCH.

In some aspects, the signaling comprises radio resource control (RRC) signaling. In some aspects, the RRC signaling may correspond to at least one of: dynamic scheduling, or semi-persistent scheduling (SPS). In some aspects, the resource allocation is defined by at least one of a starting orthogonal frequency division multiplexing (OFDM) symbol relative to a symbol or a duration of the URLLC transmission in symbols.

In some aspects, the signaling comprises one or more tables with indices and corresponding values identifying at least one of: timing relative to a number of symbols between a downlink resource grant and a downlink data transmission, timing relative to a number of symbols between a downlink data transmission and an uplink acknowledgement/negative acknowledgement (ACK/NACK) transmission, or timing relative to a number of symbols between an uplink resource grant and an uplink data transmission. In some aspects, the index and the value are dynamically indicated in downlink control information (DCI) associated with the URLLC transmission. In some aspects, the DCI comprises at least one of: a scheduling DCI, or an activation DCI for semi-persistent scheduling (SPS). In some aspects, the value comprises a default value for at least one of: the number of symbols between the downlink resource grant and the downlink data transmission, the number of symbols between the downlink data transmission and the uplink ACK/NACK transmission, or the number of symbols between the uplink resource grant and the uplink data transmission. In some aspects, the value is defined relative to at least one of: a start of a physical downlink control channel (PDCCH) that includes the downlink resource grant, an end of a physical downlink shared channel (PDSCH) that includes the downlink data transmission, or an end of the PDCCH that includes the uplink resource grant.

In some aspects, the signaling identifies a duration of a mini-slot for the URLLC transmission. In some aspects, when the URLLC transmission is an uplink communication, the duration of the mini-slot for the URLLC transmission is a first number of symbols and, when the URLLC transmission is a downlink communication, the duration of the mini-slot for the URLLC transmission is a second number of symbols that is different from the first number of symbols. In some aspects, the duration of the mini-slot corresponds to a physical downlink control channel (PDCCH) monitoring periodicity.

In some aspects, the signaling identifies a duration associated with a physical downlink shared channel (PDSCH)

transmission or a duration associated with a physical uplink shared channel (PUSCH) transmission. In some aspects, the duration associated with the PDSCH transmission or the duration associated with the PUSCH transmission corresponds to a mini-slot duration identified in the signaling.

In some aspects, the signaling includes a one bit parameter to indicate whether the UE is to cap the URLLC transmission at a boundary of a slot that is to include the URLLC transmission. In some aspects, the time-domain resource is identified using a starting symbol indicated in downlink control information. In some aspects, the starting symbol is defined relative to an end of at least one of: a timing between a downlink resource grant on a physical downlink control channel (PDCCH) and a downlink data transmission on a physical downlink shared channel (PDSCH), a timing between a downlink data transmission on the PDSCH and an uplink acknowledgement/negative acknowledgement (ACK/NACK) on a physical uplink control channel (PUCCH), or a timing between an uplink resource grant on the PDCCH and uplink data transmission on the PUSCH.

In some aspects, the URLLC transmission is capped according to a mini-slot duration identified in the signaling. In some aspects, the time-domain resource is identified based at least in part on an indicator in the signaling that combines a starting symbol of the time-domain resource and timing associated with the URLLC transmission. In some aspects, the indicator is defined based at least in part on at least one of: a start of a physical downlink control channel (PDCCH) that includes a downlink resource grant, an end of a physical downlink shared channel (PDSCH) that includes a downlink data transmission, or an end of a PDCCH that includes an uplink resource grant. In some aspects, the indicator comprises a default value for the starting symbol of the time-domain resource and the timing associated with the URLLC transmission.

Although FIG. 1000 shows example blocks of process 1000, in some aspects, process 1000 may include additional blocks, fewer blocks, different blocks, or differently arranged blocks than those depicted in FIG. 1000. Additionally, or alternatively, two or more of the blocks of process 1000 may be performed in parallel.

Figure 11:
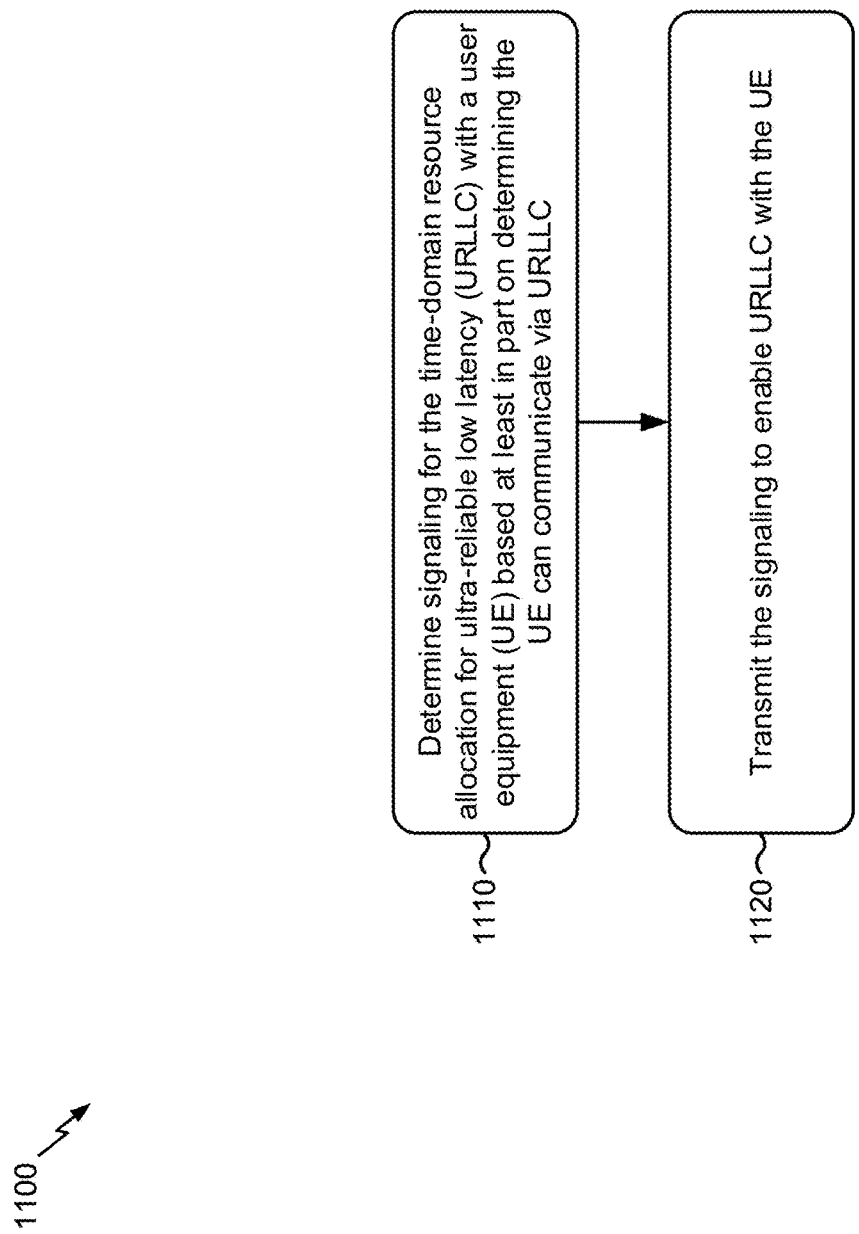
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a BS (e.g., BS 110 and/or the like) determines signaling for time-domain resources to enable URLLC transmission.

As shown in FIG. 11, in some aspects, process 1100 may include determining signaling for the time-domain resource allocation for URLLC with a UE based at least in part on determining the UE can communicate via URLLC (block 1110). For example, BS 110 (e.g., using controller/processor 240 and/or the like) may determine the signaling for URLLC with UE 120. In some aspects, BS 110 may determine the signaling based at least in part on receiving an indication from UE 120 that UE 120 is capable of communicating via URLLC.

As further shown in FIG. 11, in some aspects, process 1100 may include transmitting the signaling to enable URLLC with the UE (block 1120). For example, BS 110 (e.g., using transmit processor 220, modulator 232, antenna 234, controller/processor 240, and/or the like) may transmit the signaling to UE 120. In some aspects, BS may transmit the signaling in connection with determining the signaling and/or receiving an indication from UE 120 that UE 120 is capable of communicating via URLLC.

Process 1100 may include additional aspects, such as any single aspect or any combination of aspects described below and/or in connection with one or more other processes described elsewhere herein.

In some aspects, the URLLC transmission comprises at least one of: a physical downlink shared channel (PDSCH) communication, a physical uplink control channel (PUCCH) communication, or a physical uplink shared channel (PUSCH) communication. In some aspects, the signaling identifies at least one of: timing between a downlink resource grant on a physical downlink control channel (PDCCH) and a downlink data transmission on a physical downlink shared channel (PDSCH), timing between a downlink data transmission on the PDSCH and an uplink acknowledgement/negative acknowledgement (ACK/NACK) on a physical uplink control channel (PUCCH), or timing between an uplink resource grant on the PDCCH and uplink data transmission on the PUSCH.

In some aspects, the signaling comprises radio resource control (RRC) signaling. In some aspects, the RRC signaling may correspond to at least one of: dynamic scheduling, or semi-persistent scheduling (SPS). In some aspects, the time-domain resource is defined by at least one of a starting orthogonal frequency division multiplexing (OFDM) symbol relative to a symbol or a duration of the URLLC transmission in symbols.

In some aspects, the signaling comprises one or more tables with indices and corresponding values identifying at least one of: timing relative to a number of symbols between a downlink resource grant and a downlink data transmission, timing relative to a number of symbols between a downlink data transmission and an uplink acknowledgement/negative acknowledgement (ACK/NACK) transmission, or timing relative to a number of symbols between an uplink resource grant and an uplink data transmission. In some aspects, the index and the value are dynamically indicated in downlink control information (DCI) associated with the URLLC transmission. In some aspects, the DCI comprises at least one of: a scheduling DCI, or an activation DCI for semi-persistent scheduling (SPS). In some aspects, the value comprises a default value for at least one of: the number of symbols between the downlink resource grant and the downlink data transmission, the number of symbols between the downlink data transmission and the uplink ACK/NACK transmission, or the number of symbols between the uplink resource grant and the uplink data transmission. In some aspects, the value is defined relative to at least one of: a start of a physical downlink control channel (PDCCH) that includes the downlink resource grant, an end of a physical downlink shared channel (PDSCH) that includes the downlink data transmission, or an end of the PDCCH that includes the uplink resource grant.

In some aspects, the signaling identifies a duration of a mini-slot for the URLLC transmission. In some aspects, when the URLLC transmission is an uplink communication, the duration of the mini-slot for the URLLC transmission is a first number of symbols and, when the URLLC transmission is a downlink communication, the duration of the mini-slot for the URLLC transmission is a second number of symbols that is different from the first number of symbols. In some aspects, the duration of the mini-slot corresponds to a physical downlink control channel (PDCCH) monitoring periodicity.

In some aspects, the signaling identifies a duration associated with a physical downlink shared channel (PDSCH) transmission or a duration associated with a physical uplink shared channel (PUSCH) transmission. In some aspects, the duration associated with the PDSCH transmission or the duration associated with the PUSCH transmission corresponds to a mini-slot duration identified in the signaling.

In some aspects, the signaling includes a one bit parameter to indicate whether the UE is to cap the URLLC transmission at a boundary of a slot that is to include the URLLC transmission. In some aspects, the time-domain resource is identified using a starting symbol indicated in downlink control information. In some aspects, the starting symbol is defined relative to an end of at least one of: a timing between a downlink resource grant on a physical downlink control channel (PDCCH) and a downlink data transmission on a physical downlink shared channel (PDSCH), a timing between a downlink data transmission on the PDSCH and an uplink acknowledgement/negative acknowledgement (ACK/NACK) on a physical uplink control channel (PUCCH), or a timing between an uplink resource grant on the PDCCH and uplink data transmission on the PUSCH.

In some aspects, the URLLC transmission is capped according to a mini-slot duration identified in the signaling. In some aspects, the time-domain resource is identified based at least in part on an indicator in the signaling that combines a starting symbol of the time-domain resource and timing associated with the URLLC transmission. In some aspects, the indicator is defined based at least in part on at least one of: a start of a physical downlink control channel (PDCCH) that includes a downlink resource grant, an end of a physical downlink shared channel (PDSCH) that includes a downlink data transmission, or an end of a PDCCH that includes an uplink resource grant. In some aspects, the indicator comprises a default value for the starting symbol of the time-domain resource and the timing associated with the URLLC transmission.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
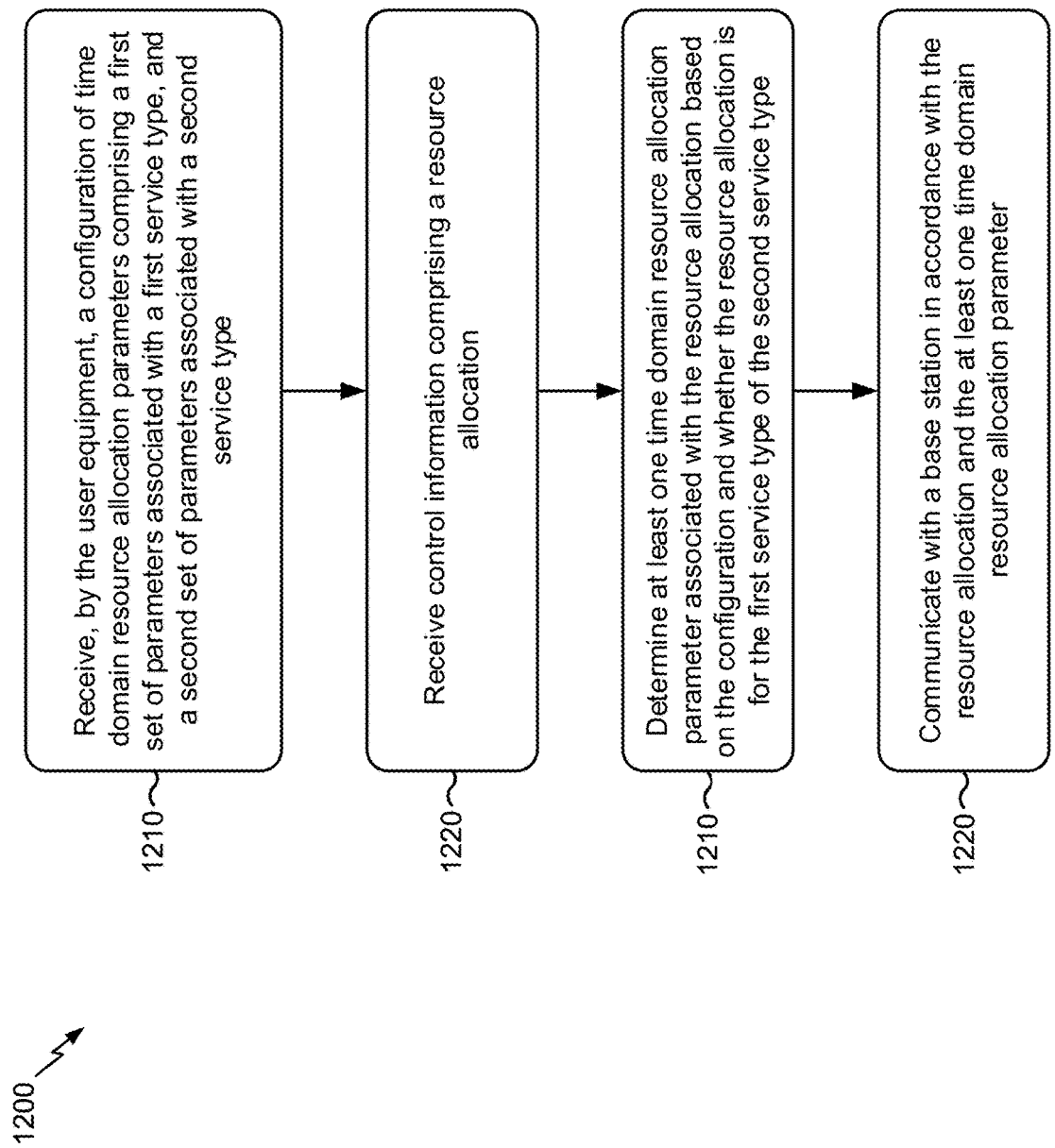
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120) uses a resource allocation parameter based at least in part on a service type being used to communicate with a base station.

As shown in FIG. 12, in some aspects, process 1200 may include receiving, by the user equipment, a configuration of time-domain resource allocation parameters comprising a first set of parameters associated with a first service type, and a second set of parameters associated with a second service type (block 1210). For example, UE 120 (e.g., using antenna 252, demodulator 254, MIMO detector 256, receive processor 258, controller/processor 280, and/or the like) may receive the configuration from BS 110. In some aspects, UE 120 may receive the configuration in connection with being in communication with BS 110 or coming into communication range of BS 110.

As further shown in FIG. 12, in some aspects, process 1200 may include receiving control information comprising a resource allocation (block 1220). For example, UE 120 (e.g., using antenna 252, demodulator 254, MIMO detector 256, receive processor 258, controller/processor 280, and/or the like) may receive the control information. The control information may identify a resource allocation. In some aspects, UE 120 may receive the control information in connection with receiving the configuration.

As further shown in FIG. 12, in some aspects, process 1200 may include determining at least one time-domain resource allocation parameter associated with the resource allocation based at least in part on the configuration and whether the resource allocation is for the first service type or the second service type (block 1230). For example, UE 120 (e.g., using MIMO detector 256, receive processor 258, controller/processor 280, and/or the like) may determine the time-domain resource allocation and service type. In some aspects, UE 120 may determine the time-domain resource allocation in connection with receiving the configuration and the control information.

As further shown in FIG. 12, in some aspects, process 1200 may include communicating with a base station in accordance with the resource allocation and the at least one time-domain resource allocation parameter (block 1240). For example, UE 120 (e.g., using antenna 252, transmit processor 264, TX MIMO processor 266, controller/processor 280, and/or the like) may communicate with BS 110. In some aspects, UE 120 may communicate with BS 110 in connection with determining the at least one time-domain resource allocation parameter and/or the service type.

Process 1200 may include additional aspects, such as any single aspect or any combination of aspects described below and/or in connection with one or more other processes described elsewhere herein.

In some aspects, the first service type and the second service type are associated with different transmission time interval (TTI) durations. In some aspects, first service type comprises an enhanced mobile broadband (eMBB) service and the second service type comprises ultra-reliable low latency communication (URLLC) service.

In some aspects, the first service type is associated with a slot-based TTI duration comprising a first number of orthogonal frequency division multiplexing (OFDM) symbols, and the second service type is associated with a mini-slot-based or non-slot based TTI duration comprising a second number of OFDM symbols less than the first number of OFDM symbols. In some aspects, the configuration comprises a radio resource control (RRC) configuration, the first set of parameters comprises one or more slot-based time-domain resource allocation parameters, and the second set of parameters comprises one or more symbol-based time-domain resource allocation parameters.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
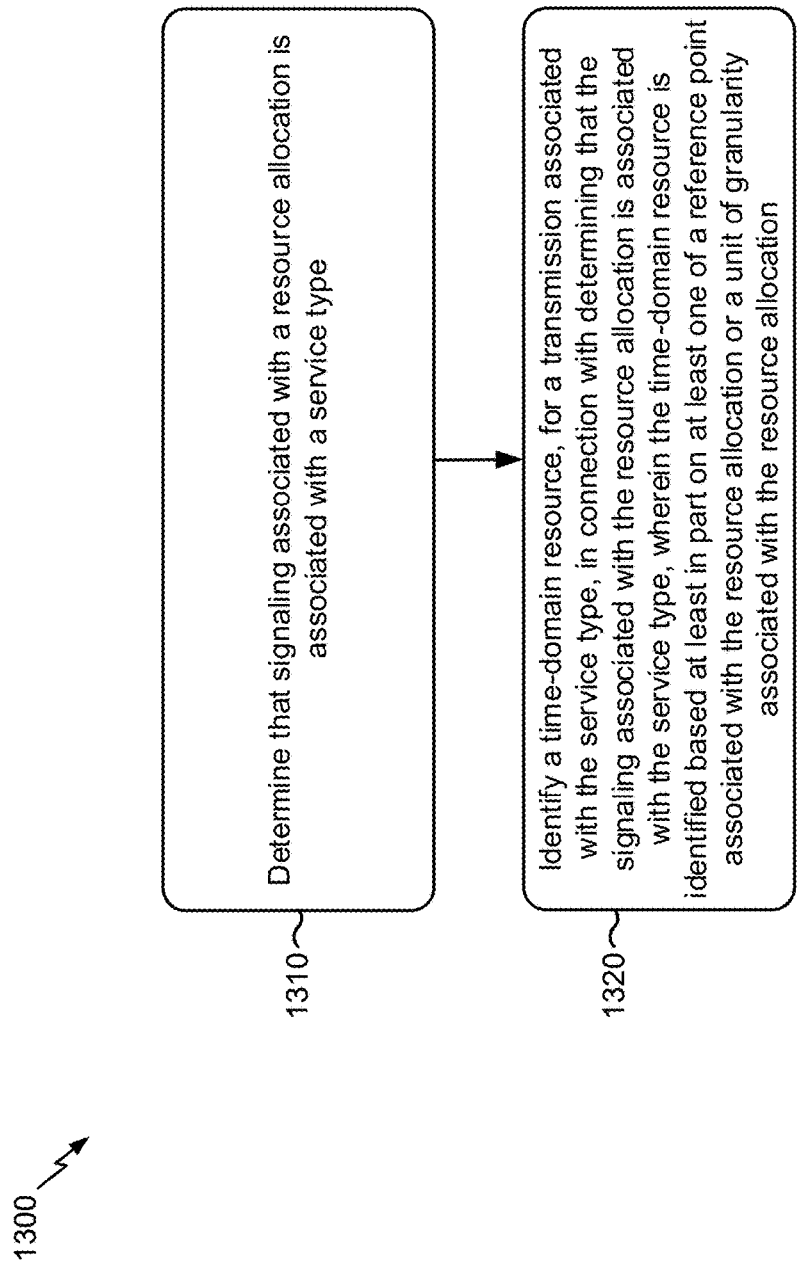
FIG. 13 is a diagram illustrating an example process performed, for example, by a user equipment, in accordance with various aspects of the present disclosure.

FIG. 13 is a diagram illustrating an example process 1300 performed, for example, by a user equipment, in accordance with various aspects of the present disclosure. Example process 1300 is an example where a UE (e.g., UE 120 and/or the like) performs operations associated with signaling for sub-slot time-domain resource allocation.

As shown in FIG. 13, in some aspects, process 1300 may include determining that signaling associated with a resource allocation is associated with a service type (block 1310). For example, the UE (e.g., using receive processor 258, transmit processor 264, controller/processor 280, memory 282, and/or the like) may determine that signaling associated with a resource allocation is associated with a service type, as described above.

As further shown in FIG. 13, in some aspects, process 1300 may include identifying a time-domain resource, for a transmission associated with the service type, in connection with determining that the signaling associated with the resource allocation is associated with the service type, wherein the time-domain resource is identified based at least in part on at least one of a reference point associated with the resource allocation or a unit of granularity associated with the resource allocation (block 1320). For example, the UE (e.g., using receive processor 258, transmit processor 264, controller/processor 280, memory 282, and/or the like) may identify a time-domain resource, for a transmission associated with the service type, in connection with determining that the signaling associated with the resource allocation is associated with the service type. In some aspects, the time-domain resource is identified based at least in part on at least one of a reference point associated with the resource allocation or a unit of granularity associated with the resource allocation.

Process 1300 may include additional aspects, such as any single aspect or any combination of aspects described below and/or in connection with one or more other processes described elsewhere herein.

In a first aspect, the service type is a first service type, and the UE may receive a configuration of time-domain resource allocation parameters comprising a first set of parameters associated with the first service type and a second set of parameters associated with a second service type, wherein identifying the time-domain resource is based at least in part on the configuration.

In a second aspect, alone or in combination with the first aspect, the transmission comprises at least one of: a physical downlink shared channel (PDSCH) communication, a physical uplink control channel (PUCCH) communication, or a physical uplink shared channel (PUSCH) communication.

In a third aspect, alone or in combination with one or more of the first and second aspects, the signaling identifies at least one of timing between a downlink resource grant on a physical downlink control channel (PDCCH) and a downlink data transmission on a physical downlink shared channel (PDSCH), timing between a downlink data transmission on the PDSCH and a hybrid automatic repeat request acknowledgment (HARQ-ACK) transmission on a physical uplink control channel (PUCCH), or timing between an uplink resource grant on the PDCCH and uplink data transmission on the physical uplink shared channel (PUSCH).

In a fourth aspect, alone or in combination with one or more of the first through third aspects, the signaling identifies timing between an earliest possible start of a hybrid automatic repeat request acknowledgment (HARQ-ACK) transmission on a physical uplink control channel (PUCCH) and a start of the time-domain resource.

In a fifth aspect, alone or in combination with one or more of the first through fourth aspects, the signaling comprises radio resource control (RRC) signaling.

In a sixth aspect, alone or in combination with one or more of the first through fifth aspects, the signaling may correspond to at least one of dynamic scheduling or semi-persistent scheduling.

In a seventh aspect, alone or in combination with one or more of the first through sixth aspects, the time-domain resource is defined by at least one of a starting orthogonal frequency division multiplexing (OFDM) symbol relative to a unit of granularity or a duration of the transmission in terms of symbols.

In an eighth aspect, alone or in combination with one or more of the first through seventh aspects, the signaling comprises one or more tables with indices and corresponding values identifying at least one of: timing in terms of a number of units between a downlink resource grant and a downlink data transmission, timing in terms of a number of units between a downlink data transmission and a hybrid automatic repeat request acknowledgment (HARQ-ACK) transmission, or timing in terms of a number of units between an uplink resource grant and an uplink data transmission.

In a ninth aspect, alone or in combination with one or more of the first through eighth aspects, the indices and the values are dynamically indicated in downlink control information (DCI) included in the signaling.

In a tenth aspect, alone or in combination with one or more of the first through ninth aspects, the DCI comprises at least one of a scheduling DCI or an activation DCI for semi-persistent scheduling.

In an eleventh aspect, alone or in combination with one or more of the first through tenth aspects, the value comprises a default value for at least one of the number of symbols between the downlink resource grant and the downlink data transmission, the number of symbols between the downlink data transmission and the HARQ-ACK transmission, or the number of symbols between the uplink resource grant and the uplink data transmission.

In a twelfth aspect, alone or in combination with one or more of the first through eleventh aspects, the value is defined relative to at least one of: a start of a physical downlink control channel (PDCCH) that includes the downlink resource grant, an end of a physical downlink shared channel (PDSCH) that includes the downlink data transmission, or an end of the PDCCH that includes the uplink resource grant.

In a thirteenth aspect, alone or in combination with one or more of the first through twelfth aspects, the transmission comprises the downlink data transmission, the HARQ-ACK transmission, or the uplink data transmission.

In a fourteenth aspect, alone or in combination with one or more of the first through thirteenth aspects, the time-domain resource is identified using a starting symbol indicated in downlink control information.

In a fifteenth aspect, alone or in combination with one or more of the first through fourteenth aspects, the starting symbol is defined relative to an end of at least one of: the timing in terms of the number of units between the downlink resource grant and the downlink data transmission, the timing in terms of the number of units between the downlink data transmission and the hybrid automatic repeat request acknowledgment (HARQ-ACK) transmission, or the timing in terms of a number of units between an uplink resource grant and an uplink data transmission.

In a sixteenth aspect, alone or in combination with one or more of the first through fifteenth aspects, the signaling identifies a duration of a mini-slot for the URLLC transmission.

In a seventeenth aspect, alone or in combination with one or more of the first through sixteenth aspects, when the transmission is an uplink communication, the duration of the mini-slot for the transmission is a first number of symbols and, when the transmission is a downlink communication, the duration of the mini-slot for URLLC transmission is a second number of symbols that is different from the first number of symbols.

In an eighteenth aspect, alone or in combination with one or more of the first through seventeenth aspects, the duration of the mini-slot corresponds to a physical downlink control channel (PDCCH) monitoring periodicity.

In a nineteenth aspect, alone or in combination with one or more of the first through eighteenth aspects, the signaling identifies a duration associated with a physical downlink shared channel (PDSCH) transmission or a duration associated with a physical uplink shared channel (PUSCH) transmission.

In a twentieth aspect, alone or in combination with one or more of the first through nineteenth aspects, the duration associated with the PDSCH transmission or the duration associated with the PUSCH transmission corresponds to a mini-slot duration identified in the signaling.

In a twenty first aspect, alone or in combination with one or more of the first through twentieth aspects, the signaling includes a parameter to indicate whether the UE is to cap the transmission at a boundary of a slot that is to include the transmission.

In a twenty second aspect, alone or in combination with one or more of the first through twenty first aspects, the transmission is capped according to a mini-slot duration identified in the signaling.

In a twenty third aspect, alone or in combination with one or more of the first through twenty second aspects, the time-domain resource is identified based at least in part on an indicator in the signaling that combines a starting symbol of the time-domain resource and timing associated with the transmission.

In a twenty fourth aspect, alone or in combination with one or more of the first through twenty third aspects, the indicator is defined based at least in part on at least one of a start of a physical downlink control channel (PDCCH) that includes a downlink resource grant, an end of a physical downlink shared channel (PDSCH) that includes a downlink data transmission, or an end of a PDCCH that includes an uplink resource grant.

In a twenty fifth aspect, alone or in combination with one or more of the first through twenty fourth aspects, the indicator comprises a default value for the starting symbol of the time-domain resource and the timing associated with the URLLC transmission.

In a twenty sixth aspect, alone or in combination with one or more of the first through twenty fifth aspects, the unit of granularity comprises one of: a symbol unit, a mini-slot unit, or a sub-slot unit.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
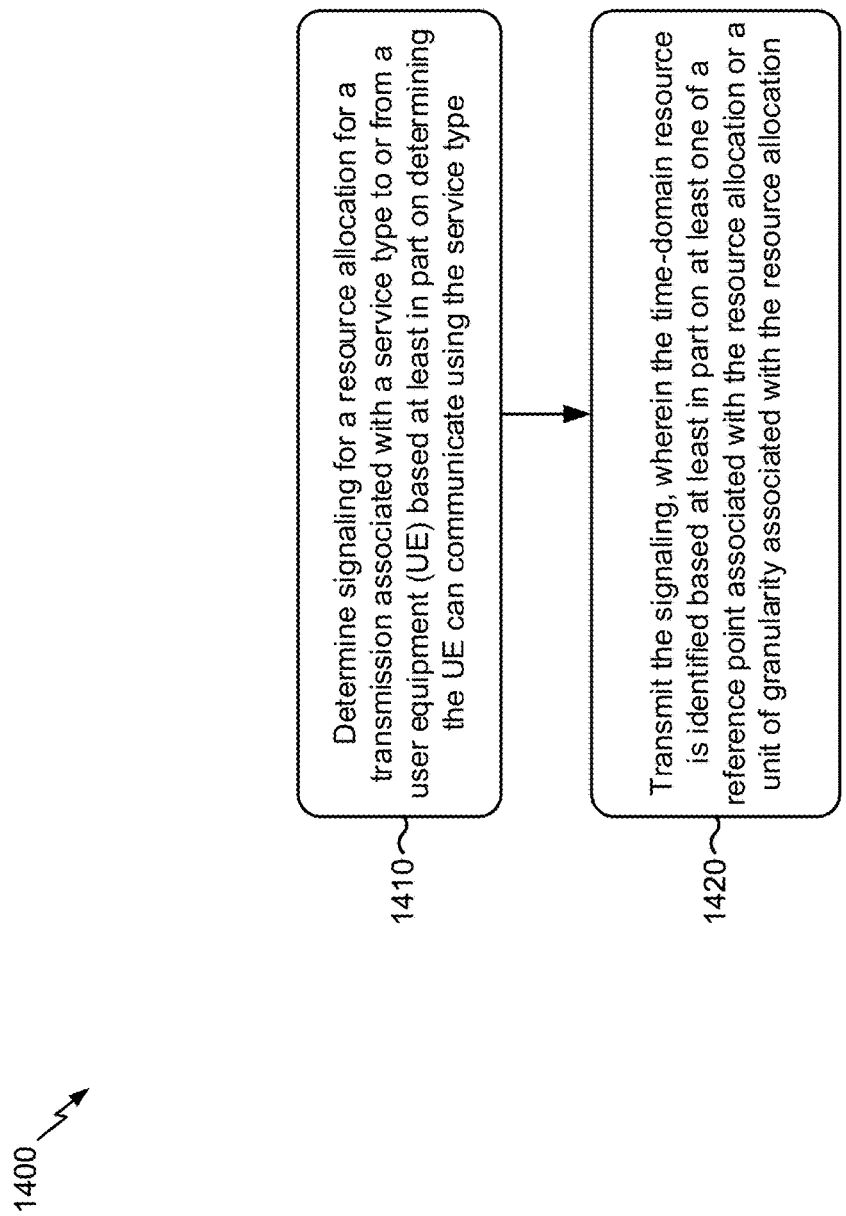
FIG. 14 is a diagram illustrating an example process performed, for example, by a base station, in accordance with various aspects of the present disclosure.

FIG. 14 is a diagram illustrating an example process 1400 performed, for example, by a base station, in accordance with various aspects of the present disclosure. Example process 1400 is an example where a base station (e.g., base station 110 and/or the like) performs operations associated with signaling for sub-slot time-domain resource allocation.

As shown in FIG. 14, in some aspects, process 1400 may include determining signaling for a resource allocation for a transmission associated with a service type to or from a user equipment (UE) based at least in part on determining the UE can communicate using the service type (block 1410). For example, the base station (e.g., using transmit processor 220, receive processor 238, controller/processor 240, memory 242, and/or the like) may determine signaling for the time-domain resource allocation for a transmission associated with a service type to or from a user equipment (UE) based at least in part on determining the UE can communicate using the service type, as described above.

As further shown in FIG. 14, in some aspects, process 1400 may include transmitting the signaling, wherein the time-domain resource is identified based at least in part on at least one of a reference point associated with the resource allocation or a unit of granularity associated with the resource allocation (block 1420). For example, the base station (e.g., using transmit processor 220, receive processor 238, controller/processor 240, memory 242, and/or the like) may transmit the signaling. In some aspects, the time-domain resource is identified based at least in part on at least one of a reference point associated with the resource allocation or a unit of granularity associated with the resource allocation.

Process 1400 may include additional aspects, such as any single aspect or any combination of aspects described below and/or in connection with one or more other processes described elsewhere herein.

In a first aspect, the service type is a first service type, and the base station may transmit a configuration of time-domain resource allocation parameters comprising a first set of parameters associated with the first service type and a second set of parameters associated with a second service type.

In a second aspect, alone or in combination with the first aspect, the signaling identifies timing between an earliest possible start of a hybrid automatic repeat request acknowledgment (HARQ-ACK) transmission on a physical uplink control channel (PUCCH) and a start of the time-domain resource.

In a third aspect, alone or in combination with one or more of the first and second aspects, the transmission comprises at least one of: a physical downlink shared channel (PDSCH) communication, a physical uplink control channel (PUCCH) communication, or a physical uplink shared channel (PUSCH) communication.

In a fourth aspect, alone or in combination with one or more of the first through third aspects, the signaling identifies at least one of: timing between a downlink resource grant on a physical downlink control channel (PDCCH) and a downlink data transmission on a physical downlink shared channel (PDSCH), timing between a downlink data transmission on the PDSCH and a hybrid automatic repeat request acknowledgment (HARQ-ACK) transmission, or timing between an uplink resource grant on the PDCCH and uplink data transmission on the PUSCH.

In a fifth aspect, alone or in combination with one or more of the first through fourth aspects, the signaling comprises radio resource control (RRC) signaling.

In a sixth aspect, alone or in combination with one or more of the first through fifth aspects, the signaling corresponds to at least one of dynamic scheduling or semi-persistent scheduling.

In a seventh aspect, alone or in combination with one or more of the first through sixth aspects, the time-domain resource allocation is defined by at least one of a starting orthogonal frequency division multiplexing (OFDM) symbol relative to a unit of granularity or a duration of the transmission in terms of symbols.

In an eighth aspect, alone or in combination with one or more of the first through seventh aspects, the signaling comprises one or more tables with indices and corresponding values identifying at least one of: timing in terms of a number of units between a downlink resource grant and a downlink data transmission, timing in terms of a number of units between a downlink data transmission and a hybrid automatic repeat request acknowledgment (HARQ-ACK) transmission, or timing in terms of a number of units between an uplink resource grant and an uplink data transmission.

In a ninth aspect, alone or in combination with one or more of the first through eighth aspects, the indices and the values are dynamically indicated in downlink control information (DCI) included in the signaling.

In a tenth aspect, alone or in combination with one or more of the first through ninth aspects, the DCI comprises at least one of: a scheduling DCI or an activation DCI for semi-persistent scheduling.

In an eleventh aspect, alone or in combination with one or more of the first through tenth aspects, the value comprises a default value for at least one of: the number of symbols between the downlink resource grant and the downlink data transmission, the number of symbols between the downlink data transmission and the HARQ-ACK transmission, or the number of symbols between the uplink resource grant and the uplink data transmission.

In a twelfth aspect, alone or in combination with one or more of the first through eleventh aspects, the value is defined relative to at least one of: a start of a physical downlink control channel (PDCCH) that includes the downlink resource grant, an end of a physical downlink shared channel (PDSCH) that includes the downlink data transmission, or an end of the PDCCH that includes the uplink resource grant.

In a thirteenth aspect, alone or in combination with one or more of the first through twelfth aspects, the transmission comprises the downlink data transmission, the HARQ-ACK transmission, or the uplink data transmission.

In a fourteenth aspect, alone or in combination with one or more of the first through thirteenth aspects, the time-domain resource is identified using a starting symbol indicated in downlink control information.

In a fifteenth aspect, alone or in combination with one or more of the first through fourteenth aspects, the starting symbol is defined relative to an end of at least one of: the timing in terms of the number of units between the downlink resource grant and the downlink data transmission, the timing in terms of the number of units between the downlink data transmission and the hybrid automatic repeat request acknowledgment (HARQ-ACK) transmission, or the timing in terms of a number of units between an uplink resource grant and an uplink data transmission.

In a sixteenth aspect, alone or in combination with one or more of the first through fifteenth aspects, the signaling identifies a duration of a mini-slot for the transmission.

In a seventeenth aspect, alone or in combination with one or more of the first through sixteenth aspects, when the transmission is an uplink communication, the duration of the mini-slot for the transmission is a first number of symbols and, when the transmission is a downlink communication, the duration of the mini-slot for the transmission is a second number of symbols that is different from the first number of symbols.

In an eighteenth aspect, alone or in combination with one or more of the first through seventeenth aspects, the duration of the mini-slot corresponds to a physical downlink control channel (PDCCH) monitoring periodicity.

In a nineteenth aspect, alone or in combination with one or more of the first through eighteenth aspects, the signaling identifies a duration associated with a physical downlink shared channel (PDSCH) transmission or a duration associated with a physical uplink shared channel (PUSCH) transmission.

In a twentieth aspect, alone or in combination with one or more of the first through nineteenth aspects, the duration associated with the PDSCH transmission or the duration associated with the PUSCH transmission corresponds to a mini-slot duration identified in the signaling.

In a twenty first aspect, alone or in combination with one or more of the first through twentieth aspects, the signaling includes a parameter to indicate whether the UE is to cap the transmission at a boundary of a slot that is to include the transmission.

In a twenty second aspect, alone or in combination with one or more of the first through twenty first aspects, the transmission is capped according to a mini-slot duration identified in the signaling.

In a twenty third aspect, alone or in combination with one or more of the first through twenty second aspects, the time-domain resource is identified based at least in part on an indicator in the signaling that combines a starting symbol of the time-domain resource and timing associated with the transmission.

In a twenty fourth aspect, alone or in combination with one or more of the first through twenty third aspects, the indicator is defined based at least in part on at least one of: a start of a physical downlink control channel (PDCCH) that includes a downlink resource grant, an end of a physical downlink shared channel (PDSCH) that includes a downlink data transmission, or an end of a PDCCH that includes an uplink resource grant.

In a twenty fifth aspect, alone or in combination with one or more of the first through twenty fourth aspects, the indicator comprises a default value for the starting symbol of the time-domain resource and the timing associated with the transmission.

In a twenty sixth aspect, alone or in combination with one or more of the first through twenty fifth aspects, the service type is a first service type, and the UE may transmit a configuration of time-domain resource allocation parameters comprising a first set of parameters associated with the first service type and a second set of parameters associated with a second service type, wherein a time-domain resource associated with the resource allocation is to be identified based at least in part on the configuration.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations are contemplated in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication performed by a user equipment (UE), comprising:
   receiving signaling comprising an index value associated with a service type; and
   identifying a starting symbol of a time-domain resource, for a transmission associated with the service type, based on the signaling,
      wherein the starting symbol of the time-domain resource is identified using a starting symbol of a physical downlink control channel (PDCCH) that includes the signaling as a reference point.

2. The method of claim 1, wherein the service type is a first service type, and wherein the method further comprises:
   receiving a configuration of time-domain resource allocation parameters comprising a first set of parameters associated with the first service type and a second set of parameters associated with a second service type,
      wherein identifying the starting symbol of the time-domain resource is based at least in part on the configuration.

3. The method of claim 1, wherein the transmission comprises at least one of:
   a physical downlink shared channel (PDSCH) communication,
   a physical uplink control channel (PUCCH) communication, or
   a physical uplink shared channel (PUSCH) communication.

4. The method of claim 1, wherein the signaling identifies at least one of:
   timing between a downlink resource grant on the PDCCH and a downlink data transmission on a physical downlink shared channel (PDSCH),
   timing between a downlink data transmission on the PDSCH and a hybrid automatic repeat request acknowledgment (HARQ-ACK) transmission on a physical uplink control channel (PUCCH), or
   timing between an uplink resource grant on the PDCCH and uplink data transmission on a physical uplink shared channel (PUSCH).

5. The method of claim 1, wherein the signaling identifies timing between an earliest possible start of a hybrid automatic repeat request acknowledgment (HARQ-ACK) transmission on a physical uplink control channel (PUCCH) and a start of the time-domain resource.

6. The method of claim 1, wherein the signaling comprises radio resource control (RRC) signaling.

7. The method of claim 1, wherein the signaling corresponds to at least one of:
   dynamic scheduling, or
   semi-persistent scheduling (SPS).

8. The method of claim 1, wherein the time-domain resource is defined by at least one of a starting orthogonal frequency division multiplexing (OFDM) symbol relative to a unit of granularity or a duration of the transmission in terms of symbols.

9. The method of claim 1, wherein the signaling comprises one or more tables with indices and corresponding values identifying at least one of:
   timing in terms of a number of units between a downlink resource grant and a downlink data transmission,
   timing in terms of a number of units between the downlink data transmission and a hybrid automatic repeat request acknowledgment (HARQ-ACK) transmission, or
   timing in terms of a number of units between an uplink resource grant and an uplink data transmission.

10. The method of claim 9, wherein a value, of the corresponding values, comprises a default value for at least one of:
    the number of units between the downlink resource grant and the downlink data transmission,
    the number of units between the downlink data transmission and the HARQ-ACK transmission, or
    the number of units between the uplink resource grant and the uplink data transmission.

11. The method of claim 9, wherein a value, of the corresponding values, is defined relative to at least one of:
    a start of the PDCCH that includes the downlink resource grant,
    an end of a physical downlink shared channel (PDSCH) that includes the downlink data transmission, or
    an end of the PDCCH that includes the uplink resource grant.

12. The method of claim 9, wherein the starting symbol of the time-domain resource is identified using a starting symbol indicated in downlink control information.

13. The method of claim 12, wherein the starting symbol indicated in the downlink control information is defined relative to an end of at least one of:
    the timing in terms of the number of units between the downlink resource grant and the downlink data transmission,
    the timing in terms of the number of units between the downlink data transmission and the HARQ-ACK transmission, or the timing in terms of the number of units between the uplink resource grant and the uplink data transmission.

14. The method of claim 10, wherein the default value for the number of units between the downlink resource grant and the downlink data transmission is zero.

15. The method of claim 9, wherein the indices and the corresponding values are dynamically indicated in downlink control information (DCI) included in the signaling.

16. The method of claim 15, wherein the DCI comprises at least one of:
   a scheduling DCI, or
   an activation DCI for semi-persistent scheduling (SPS).

17. The method of claim 1, wherein the signaling identifies a duration of a mini-slot for the transmission.

18. The method of claim 17, wherein, when the transmission is an uplink communication, the duration of the mini-slot for the transmission is a first number of symbols and, when the transmission is a downlink communication, the duration of the mini-slot for the transmission is a second number of symbols that is different from the first number of symbols.

19. The method of claim 17, wherein the duration of the mini-slot corresponds to a PDCCH monitoring periodicity.

20. The method of claim 1, wherein the signaling identifies a duration associated with a physical downlink shared channel (PDSCH) transmission or a duration associated with a physical uplink shared channel (PUSCH) transmission.

21. The method of claim 20, wherein the duration associated with the PDSCH transmission or the duration associated with the PUSCH transmission corresponds to a mini-slot duration identified in the signaling.

22. The method of claim 1, wherein the signaling includes a parameter to indicate whether the UE is to cap the transmission at a boundary of a slot that is to include the transmission.

23. The method of claim 1, wherein the transmission is capped according to a mini-slot duration identified in the signaling.

24. The method of claim 1, wherein the time-domain resource is identified based at least in part on an indicator in the signaling that combines the starting symbol of the time-domain resource and timing associated with the transmission.

25. The method of claim 24, wherein the combination of the starting symbol of the time-domain resource and the timing associated with the transmission is defined relative to at least one of:
   a start of the PDCCH that includes a downlink resource grant,
   an end of a physical downlink shared channel (PDSCH) that includes a downlink data transmission, or
   an end of the PDCCH that includes an uplink resource grant.

26. The method of claim 1, wherein the starting symbol of the time domain resource is identified based at least in part on a unit of granularity comprising one of:
   a symbol unit,
   a mini-slot unit, or
   a sub-slot unit.

27. A method of wireless communication performed by a base station (BS), comprising:
   determining signaling for a resource allocation for a transmission associated with a service type to or from a user equipment (UE) based at least in part on determining the UE can communicate using the service type, wherein the signaling comprises an index value associated with the service type; and
   transmitting the signaling,
      wherein a starting symbol of a time-domain resource, for the transmission, is identified using a starting symbol of a physical downlink control channel (PDCCH) that includes the signaling as a reference point.

28. The method of claim 27, wherein the service type is a first service type, and wherein the method further comprises:
   transmitting a configuration of time-domain resource allocation parameters comprising a first set of parameters associated with the first service type and a second set of parameters associated with a second service type,
      wherein the time-domain resource is to be identified based at least in part on the configuration.

29. The method of claim 27, wherein the signaling identifies timing between an earliest possible start of a hybrid automatic repeat request acknowledgment (HARQ-ACK) transmission on a physical uplink control channel (PUCCH) and the starting symbol of the time-domain resource.

30. The method of claim 27, wherein the transmission comprises at least one of:
   a physical downlink shared channel (PDSCH) communication,
   a physical uplink control channel (PUCCH) communication, or
   a physical uplink shared channel (PUSCH) communication.

31. The method of claim 27, wherein the signaling identifies at least one of:
   timing between a downlink resource grant on the PDCCH and a downlink data transmission on a physical downlink shared channel (PDSCH),
   timing between a downlink data transmission on the PDSCH and a hybrid automatic repeat request acknowledgment (HARQ-ACK) transmission on a physical uplink control channel (PUCCH), or
   timing between an uplink resource grant on the PDCCH and uplink data transmission on a physical uplink shared channel (PUSCH).

32. The method of claim 27, wherein the signaling comprises radio resource control (RRC) signaling.

33. The method of claim 27, wherein the signaling corresponds to at least one of:
   dynamic scheduling, or
   semi-persistent scheduling (SPS).

34. The method of claim 27, wherein the time-domain resource is defined by at least one of a starting orthogonal frequency division multiplexing (OFDM) symbol relative to a unit of granularity or a duration of the transmission in terms of symbols.

35. The method of claim 27, wherein the signaling comprises one or more tables with indices and corresponding values identifying at least one of:
   timing in terms of a number of units between a downlink resource grant and a downlink data transmission,
   timing in terms of a number of units between the downlink data transmission and a hybrid automatic repeat request acknowledgment (HARQ-ACK) transmission, or
   timing in terms of a number of units between an uplink resource grant and an uplink data transmission.

36. The method of claim 35, wherein a value, of the corresponding values, comprises a default value for the number of units between the downlink resource grant and the downlink data transmission,
   wherein the default value is zero.

37. The method of claim 27, wherein the signaling identifies a duration of a mini-slot for the transmission.

38. The method of claim 37, wherein, when the transmission is an uplink communication, the duration of the mini-slot for the transmission is a first number of symbols and, when the transmission is a downlink communication, the duration of the mini-slot for the transmission is a second number of symbols that is different from the first number of symbols.

39. The method of claim 38, wherein the duration of the mini-slot corresponds to a PDCCH monitoring periodicity.

40. The method of claim 27, wherein the time-domain resource is to be identified based at least in part on an indicator in the signaling that combines the starting symbol of the time-domain resource and timing associated with the transmission.

41. A user equipment (UE) for wireless communication, comprising:
a memory; and
one or more processors coupled to the memory, the memory and the one or more processors configured to:
receive signaling comprising an index value associated with a service type; and
identify a starting symbol of a time-domain resource, for a transmission associated with the service type, based on the signaling,
wherein the starting symbol of the time-domain resource is identified using a starting symbol of a physical downlink control channel (PDCCH) that includes the signaling as a reference point.

42. The UE of claim 41, wherein the service type is a first service type, and wherein the one or more processors are further configured to:
receive a configuration of time-domain resource allocation parameters comprising a first set of parameters associated with the first service type and a second set of parameters associated with a second service type,
wherein identifying the starting symbol of the time-domain resource is based at least in part on the configuration.

43. The UE of claim 41, wherein the transmission comprises at least one of:
a physical downlink shared channel (PDSCH) communication,
a physical uplink control channel (PUCCH) communication, or
a physical uplink shared channel (PUSCH) communication.

44. The UE of claim 41, wherein the signaling identifies at least one of:
timing between a downlink resource grant on the PDCCH and a downlink data transmission on a physical downlink shared channel (PDSCH),
timing between a downlink data transmission on the PDSCH and a hybrid automatic repeat request acknowledgment (HARQ-ACK) transmission on a physical uplink control channel (PUCCH), or
timing between an uplink resource grant on the PDCCH and uplink data transmission on a physical uplink shared channel (PUSCH).

45. The UE of claim 41, wherein the signaling identifies a duration of a mini-slot for the transmission.

46. The UE of claim 45, wherein the duration of the mini-slot corresponds to a PDCCH monitoring periodicity.

47. The UE of claim 41, wherein the starting symbol of the time domain resource is identified based at least in part on a unit of granularity comprising one of:
a symbol unit,
a mini-slot unit, or
a sub-slot unit.

48. A base station (BS) for wireless communication, comprising:
a memory; and
one or more processors coupled to the memory, the memory and the one or more processors configured to:
determine signaling for a resource allocation for a transmission associated with a service type to or from a user equipment (UE) based at least in part on determining the UE can communicate using the service type,
wherein the signaling comprises an index value associated with the service type; and
transmit the signaling,
wherein a starting symbol of a time-domain resource, for the transmission, is identified using a starting symbol of a physical downlink control channel (PDCCH) that includes the signaling as a reference point.

49. The BS of claim 48, wherein the signaling identifies a duration of a mini-slot for the transmission.

50. The BS of claim 48, wherein the time domain resource is identified based at least in part on a unit of granularity comprising one of:
a symbol unit,
a mini-slot unit, or
a sub-slot unit.

* * * * *